US012167326B2

(12) United States Patent
Shibata

(10) Patent No.: US 12,167,326 B2
(45) **Date of Patent: *Dec. 10, 2024**

(54) COMMUNICATION DEVICE AND NON-TRANSITORY COMPUTER-READABLE MEDIUM STORING COMPUTER-READABLE INSTRUCTIONS FOR COMMUNICATION DEVICE

(71) Applicant: BROTHER KOGYO KABUSHIKI KAISHA, Nagoya (JP)

(72) Inventor: Hiroshi Shibata, Yatomi (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 246 days.

This patent is subject to a terminal disclaimer.

(21) Appl. No.: 17/741,777

(22) Filed: May 11, 2022

(65) Prior Publication Data

US 2022/0272625 A1 Aug. 25, 2022

Related U.S. Application Data

(63) Continuation of application No. 17/030,642, filed on Sep. 24, 2020, now Pat. No. 11,350,358.

(30) Foreign Application Priority Data

Sep. 27, 2019 (JP) ................................ 2019-177704

(51) Int. Cl.
*H04W 48/20* (2009.01)
*H04L 9/00* (2022.01)
(Continued)

(52) U.S. Cl.
CPC ............ *H04W 48/20* (2013.01); *H04L 9/006* (2013.01); *H04L 9/0825* (2013.01); *H04W 12/0433* (2021.01); *H04W 76/10* (2018.02)

(58) Field of Classification Search
CPC . H04W 48/20; H04W 76/10; H04W 12/0433; H04L 9/006; H04L 9/0825
See application file for complete search history.

(56) References Cited

U.S. PATENT DOCUMENTS 11,350,358 B2 * 5/2022 Shibata ................ H04L 9/0825
2019/0306712 A1 * 10/2019 Suzuki ................... H04L 63/18

OTHER PUBLICATIONS

Device Provisioning Protocol Technical Specification Version 1.1, Wi-Fi Alliance, 2018 (cited in the spec at p. 1).
(Continued)

*Primary Examiner* — Ronald B Abelson
(74) *Attorney, Agent, or Firm* — Scully, Scott, Murphy & Presser, PC

(57) ABSTRACT

A communication device may execute an output control process for externally outputting output information obtained by using a public key, receive an authentication request in which the public key is used from a terminal device, send an authentication response to the terminal device, receive N pieces of wireless setting information from the terminal device, send, by using each of the N pieces of wireless setting information, a confirm signal to an access point corresponding to each of the N pieces of wireless setting information, receive a response signal in response to sending the confirm signal from each of M access points among N access points, select a target access point from among the M access points, and establish a wireless connection with the target access point.

13 Claims, 13 Drawing Sheets

(51) Int. Cl.

| | |
|---|---|
| ***H04L 9/08*** | (2006.01) |
| ***H04W 12/04*** | (2021.01) |
| ***H04W 12/0433*** | (2021.01) |
| ***H04W 76/10*** | (2018.01) |

(56) References Cited

OTHER PUBLICATIONS

Notice of Allowance dated Jan. 31, 2022 from related application U.S. Appl. No. 17/030,642.

* cited by examiner

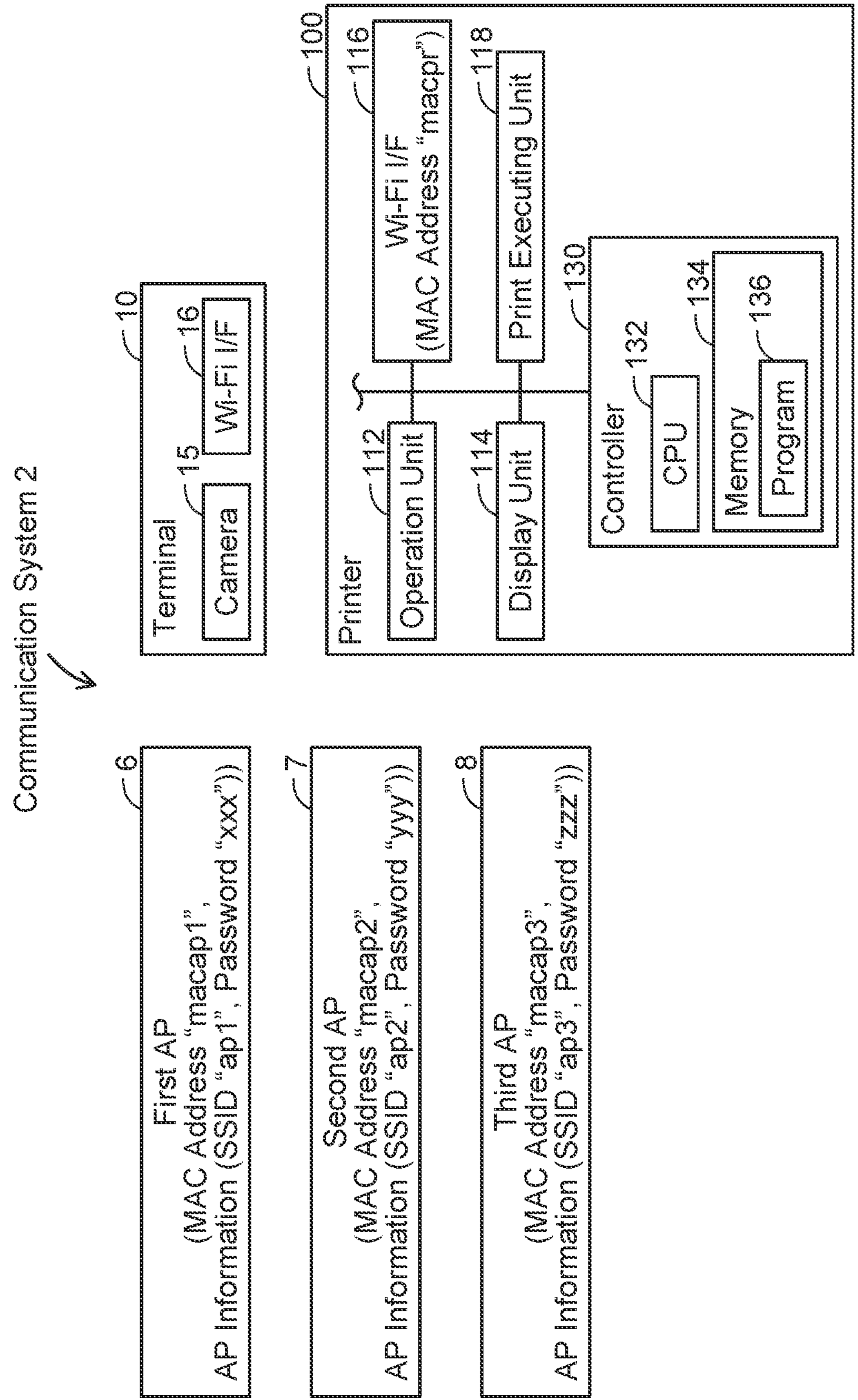
FIG. 1
Communication System 2
6
First AP
(MAC Address "macap1",
AP Information (SSID "ap1", Password "xxx"))
7
Second AP
(MAC Address "macap2",
AP Information (SSID "ap2", Password "yyy"))
8
Third AP
(MAC Address "macap3",
AP Information (SSID "ap3", Password "zzz"))
10
Terminal
15
Camera
16
Wi-Fi I/F
100
Printer
112
Operation Unit
114
Display Unit
116
Wi-Fi I/F
(MAC Address "macpr")
118
Print Executing Unit
130
Controller
132
CPU
134
Memory
136
Program

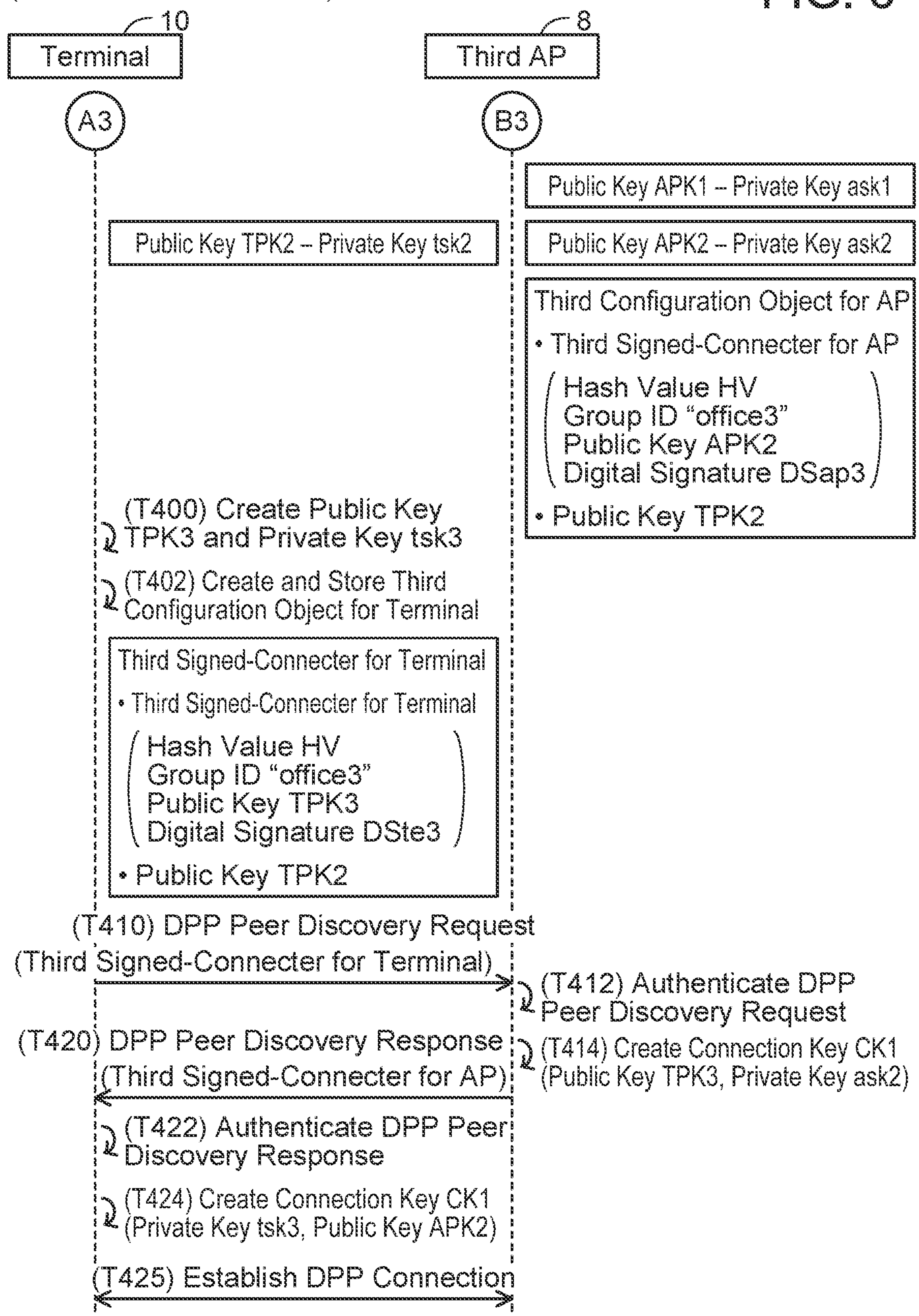

FIG. 6
(Network Access with AP)
10
Terminal
8
Third AP
A3
B3
Public Key APK1 – Private Key ask1
Public Key TPK2 – Private Key tsk2
Public Key APK2 – Private Key ask2
Third Configuration Object for AP
• Third Signed-Connecter for AP
Hash Value HV
Group ID "office3"
Public Key APK2
Digital Signature DSap3
• Public Key TPK2
(T400) Create Public Key TPK3 and Private Key tsk3
(T402) Create and Store Third Configuration Object for Terminal
Third Signed-Connecter for Terminal
• Third Signed-Connecter for Terminal
Hash Value HV
Group ID "office3"
Public Key TPK3
Digital Signature DSte3
• Public Key TPK2
(T410) DPP Peer Discovery Request
(Third Signed-Connecter for Terminal)
(T412) Authenticate DPP Peer Discovery Request
(T420) DPP Peer Discovery Response
(Third Signed-Connecter for AP)
(T414) Create Connection Key CK1
(Public Key TPK3, Private Key ask2)
(T422) Authenticate DPP Peer Discovery Response
(T424) Create Connection Key CK1
(Private Key tsk3, Public Key APK2)
(T425) Establish DPP Connection (Bootstrapping With Printer)

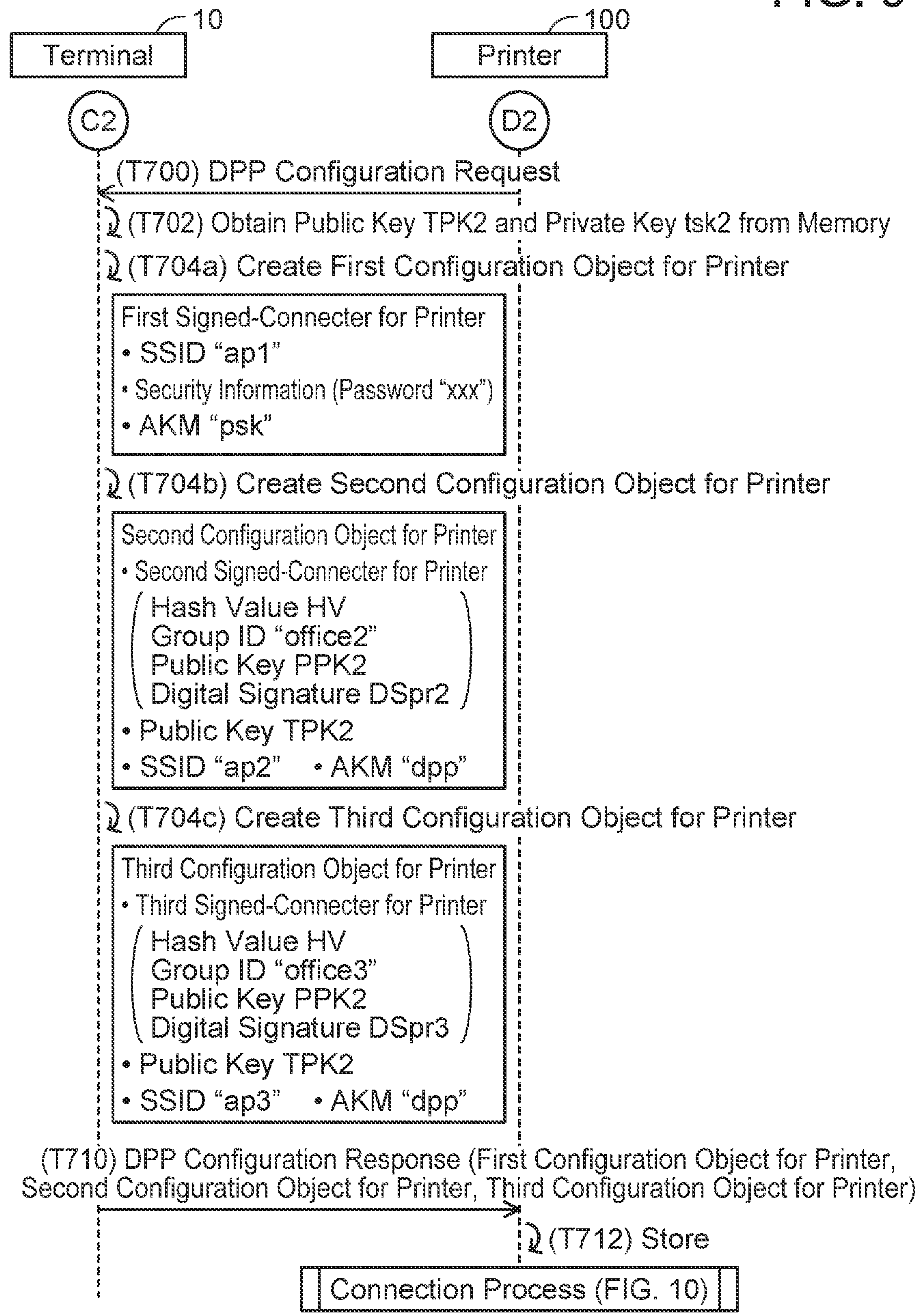
(Configuration With Printer)
FIG. 9
10
Terminal
100
Printer
C2
D2
(T700) DPP Configuration Request
(T702) Obtain Public Key TPK2 and Private Key tsk2 from Memory
(T704a) Create First Configuration Object for Printer
First Signed-Connecter for Printer
• SSID "ap1"
• Security Information (Password "xxx")
• AKM "psk"
(T704b) Create Second Configuration Object for Printer
Second Configuration Object for Printer
• Second Signed-Connecter for Printer
Hash Value HV
Group ID "office2"
Public Key PPK2
Digital Signature DSpr2
• Public Key TPK2
• SSID "ap2" • AKM "dpp"
(T704c) Create Third Configuration Object for Printer
Third Configuration Object for Printer
• Third Signed-Connecter for Printer
Hash Value HV
Group ID "office3"
Public Key PPK2
Digital Signature DSpr3
• Public Key TPK2
• SSID "ap3" • AKM "dpp"
(T710) DPP Configuration Response (First Configuration Object for Printer, Second Configuration Object for Printer, Third Configuration Object for Printer)
(T712) Store
Connection Process (FIG. 10)

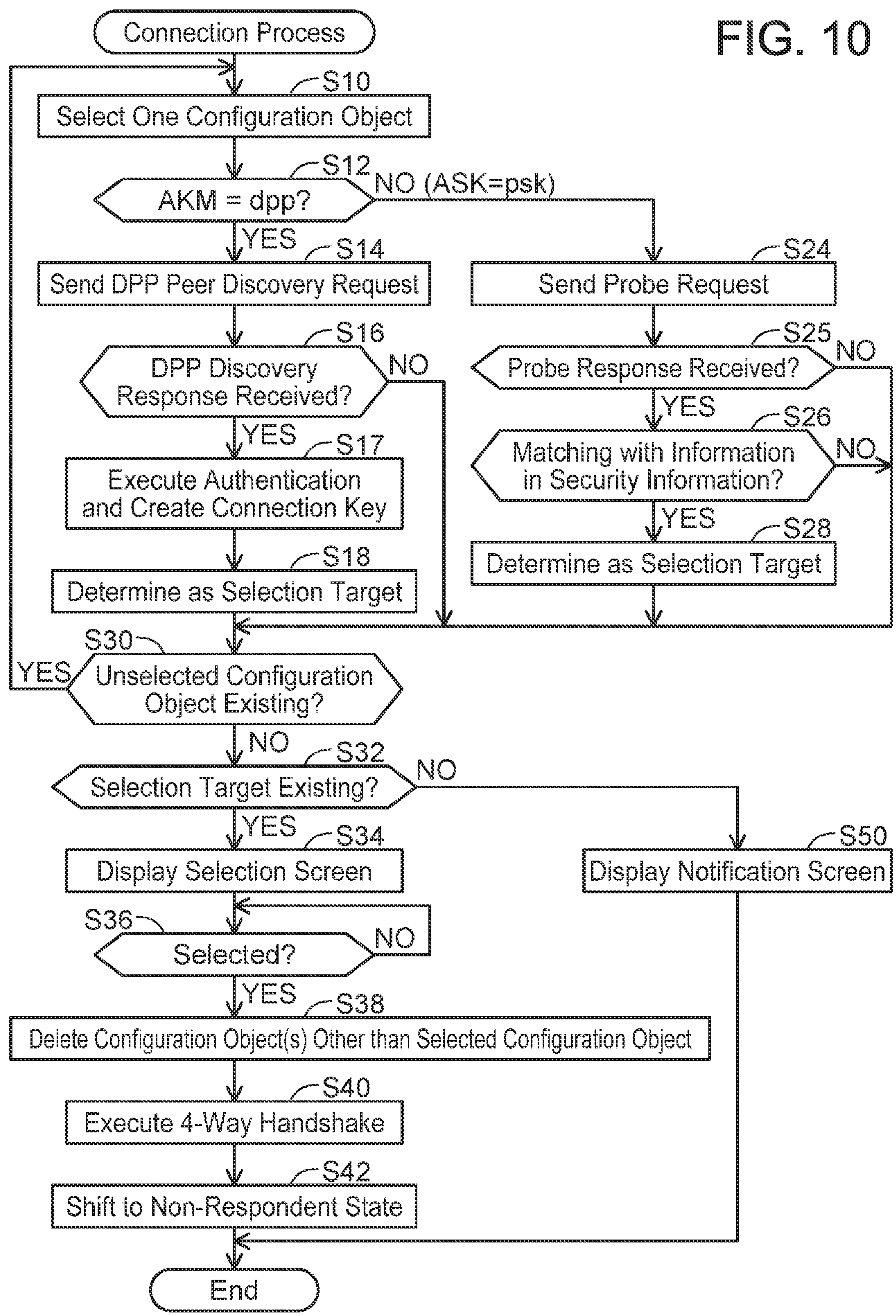
FIG. 10
Connection Process
S10
Select One Configuration Object
S12
AKM = dpp?
NO (ASK=psk)
YES
S14
Send DPP Peer Discovery Request
S24
Send Probe Request
S16
DPP Discovery Response Received?
NO
S25
Probe Response Received?
NO
YES
S26
Matching with Information in Security Information?
NO
YES
S17
Execute Authentication and Create Connection Key
S18
Determine as Selection Target
S28
Determine as Selection Target
S30
YES
Unselected Configuration Object Existing?
NO
S32
Selection Target Existing?
NO
YES
S34
Display Selection Screen
S50
Display Notification Screen
S36
Selected?
NO
YES
S38
Delete Configuration Object(s) Other than Selected Configuration Object
S40
Execute 4-Way Handshake
S42
Shift to Non-Respondent State
End

FIG. 11

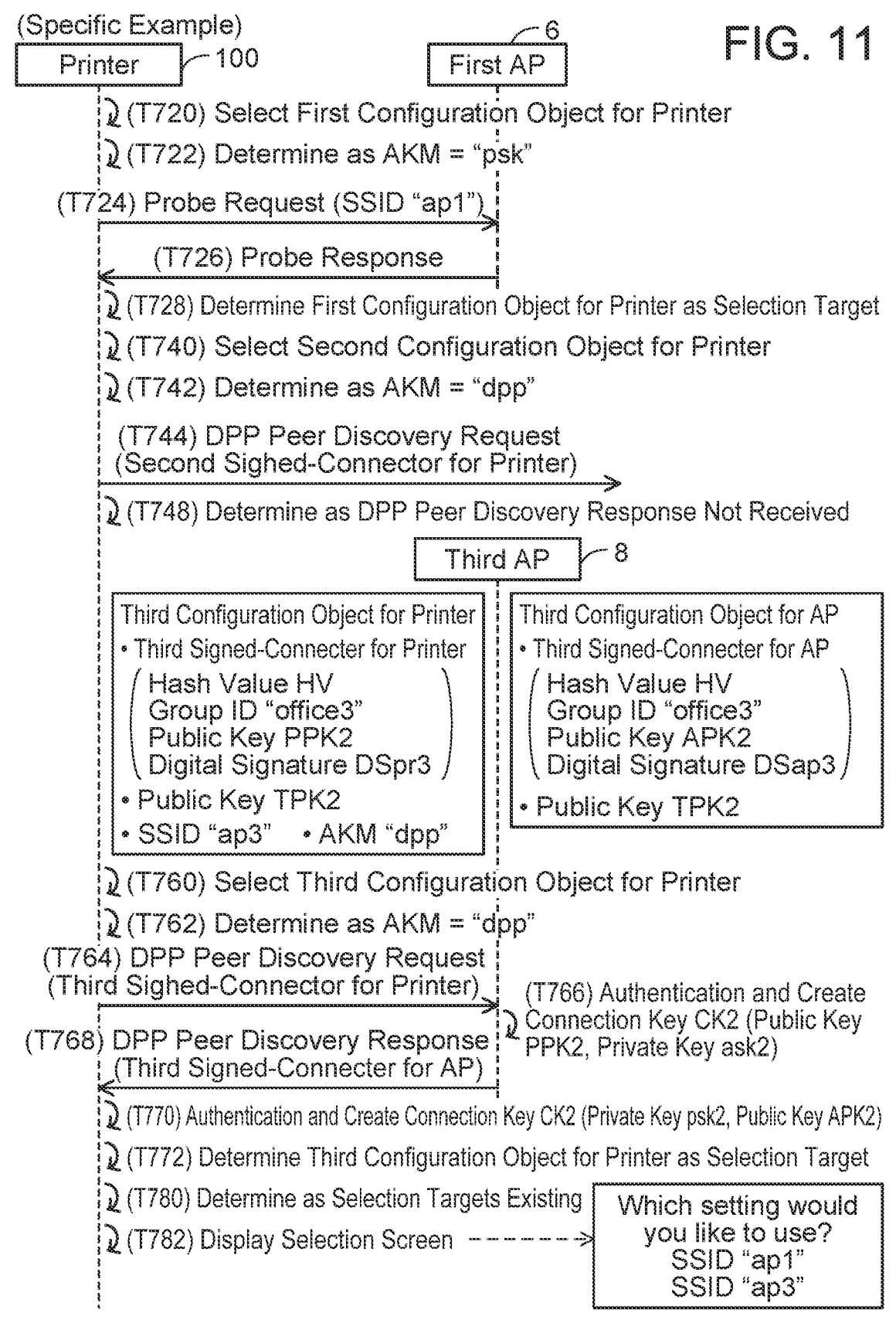

(Specific Example)

Printer 100

First AP 6

(T720) Select First Configuration Object for Printer (T722) Determine as AKM = "psk"

(T724) Probe Request (SSID "ap1")

(T726) Probe Response (T728) Determine First Configuration Object for Printer as Selection Target (T740) Select Second Configuration Object for Printer (T742) Determine as AKM = "dpp"

(T744) DPP Peer Discovery Request (Second Sighed-Connector for Printer)

(T748) Determine as DPP Peer Discovery Response Not Received

Third AP 8

Third Configuration Object for Printer
- Third Signed-Connecter for Printer
  (Hash Value HV
  Group ID "office3"
  Public Key PPK2
  Digital Signature DSpr3)
- Public Key TPK2
- SSID "ap3"
- AKM "dpp"

Third Configuration Object for AP
- Third Signed-Connecter for AP
  (Hash Value HV
  Group ID "office3"
  Public Key APK2
  Digital Signature DSap3)
- Public Key TPK2

(T760) Select Third Configuration Object for Printer (T762) Determine as AKM = "dpp"

(T764) DPP Peer Discovery Request (Third Sighed-Connector for Printer)

(T766) Authentication and Create Connection Key CK2 (Public Key PPK2, Private Key ask2)

(T768) DPP Peer Discovery Response (Third Signed-Connecter for AP)

(T770) Authentication and Create Connection Key CK2 (Private Key psk2, Public Key APK2)

(T772) Determine Third Configuration Object for Printer as Selection Target (T780) Determine as Selection Targets Existing (T782) Display Selection Screen Which setting would you like to use?
SSID "ap1"
SSID "ap3"

COMMUNICATION DEVICE AND NON-TRANSITORY COMPUTER-READABLE MEDIUM STORING COMPUTER-READABLE INSTRUCTIONS FOR COMMUNICATION DEVICE

CROSS-REFERENCE TO RELATED APPLICATION

This application is a continuation application of U.S. Ser. No. 17/030,642 filed on Sep. 24, 2022 and claims priority to Japanese Patent Application No. 2019-177704 filed on Sep. 27, 2019, the contents of which are hereby incorporated by reference into the present application.

TECHNICAL FIELD

The description herein relates to an art for establishing a wireless connection between a communication device and an external device using a terminal device.

DESCRIPTION OF RELATED ART

Device Provisioning Protocol (hereinafter referred to as "DPP"), which is a wireless communication scheme established by Wi-Fi Alliance, is known. The DPP is a wireless communication scheme for easily establishing a Wi-Fi (Registered Trademark, Wi-Fi Alliance) connection between a pair of devices. In the DPP, a first device operating as a Configurator sends wireless setting information to a second device operating as an Enrollee. The second device establishes the Wi-Fi connection with the access point using the wireless setting information received from the first device.

SUMMARY

There is a possibility that the second device cannot establish the Wi-Fi connection with the access point using the wireless setting information received from the first device. For example, the second device cannot establish the Wi-Fi connection with the access point when the second device is located at a far enough position from the access point.

The description herein provides an art for suitably establishing a Wi-Fi connection between a communication device and an access point.

A communication device disclosed herein may include; a wireless interface configured to execute a wireless communication in conformity with Wi-Fi standard; and a controller configured to: execute an output control process for externally outputting output information, the output information being obtained by using a public key; receive, from a terminal device, via the wireless interface, an authentication request in which the public key is used; send an authentication response to the terminal device via the wireless interface; after the authentication response has been sent to the terminal device, receive N pieces of wireless setting information (N being an integer of 2 or more) from the terminal device via the wireless interface, the N pieces of wireless setting information corresponding to N access points, each of the N pieces of wireless setting information being for establishing a wireless connection with an access point corresponding to the wireless setting information; send, by using each of the N pieces of wireless setting information, a confirm signal to the access point corresponding to each of the N pieces of wireless setting information via the wireless interface; receive a response signal in response to sending the confirm signal from each of M access points (M being an integer of 1 or more and less than N) among the N access points via the wireless interface; select a target access point from among the M access points; and establish a wireless connection with the selected target access point via the wireless interface.

Moreover, a communication device disclosed herein may include; a display unit; a wireless interface configured to execute a wireless communication in conformity with Wi-Fi standard; and a controller configured to: execute an output control process for externally outputting output information, the output information being obtained by using a public key of the communication device; receive, from a terminal device, via the wireless interface, an authentication request in which the public key is used after the terminal device has been obtained the public key; send an authentication response to the terminal device via the wireless interface; after the authentication response has been sent to the terminal device, receive N pieces of wireless setting information (N being an integer of 1 or more) from the terminal device via the wireless interface, the N pieces of wireless setting information corresponding to N access points, and each of the N pieces of wireless setting information being for establishing a wireless connection with an access point corresponding to the wireless setting information; send, by using each of the N pieces of wireless setting information, a confirm signal to the access point corresponding to each of the N pieces of wireless setting information via the wireless interface; receive a response signal in response to sending the confirm signal from each of M access points (M being an integer of 1 or more and less than N) among the N access points via the wireless interface; cause the display unit to display a selection screen for selecting a target access point from among the M access points; and in a case where the target access point is selected from among the M access points in the selection screen, establish a wireless connection with the selected target access point via the wireless interface.

A computer program or computer-readable instructions for the communication device, a non-transitory computer-readable medium storing this computer program or the computer-readable instructions and a method performed by the communication device are also novel and useful. A communication system comprising the terminal device and the communication device is also novel and useful.

BRIEF DESCRIPTION OF THE DRAWINGS

FIG. 1 shows a configuration of a communication system;

FIG. 6 shows a sequence diagram of a Network Access process with the AP;

FIG. 9 shows a sequence of a Configuration process with the printer;

FIG. 10 shows a flowchart of a connection process;

FIG. 11 shows a specific case of processes implemented by the connection process;

EMBODIMENTS (Configuration of Communication System 2; FIG. 1)

As shown in FIG. 1, a communication system 2 comprises three Access Points (APs) AP 6, AP 7, and AP 8, a terminal 10, and a printer 100. In the present embodiment, a situation is assumed in which each of the AP 6, AP 7 and AP 8 is installed in different rooms of a same company and the printer 100 is a portable compact printer. That is, the printer 100 may be located near the first AP 6, and may alternatively be located near the second AP 7. In such a situation, the present embodiment achieves an establishment of a wireless connection in conformity with Wi-Fi scheme (hereinafter termed "Wi-Fi connection") between the printer 100 and the first AP 6 in a case where the printer 100 is located near the first AP 6 and an establishment of a Wi-Fi connection between the printer 100 and the third AP 8 in a case where the printer 100 is located near the third AP 8.

(Configuration of Terminal 10)

Figure 2:
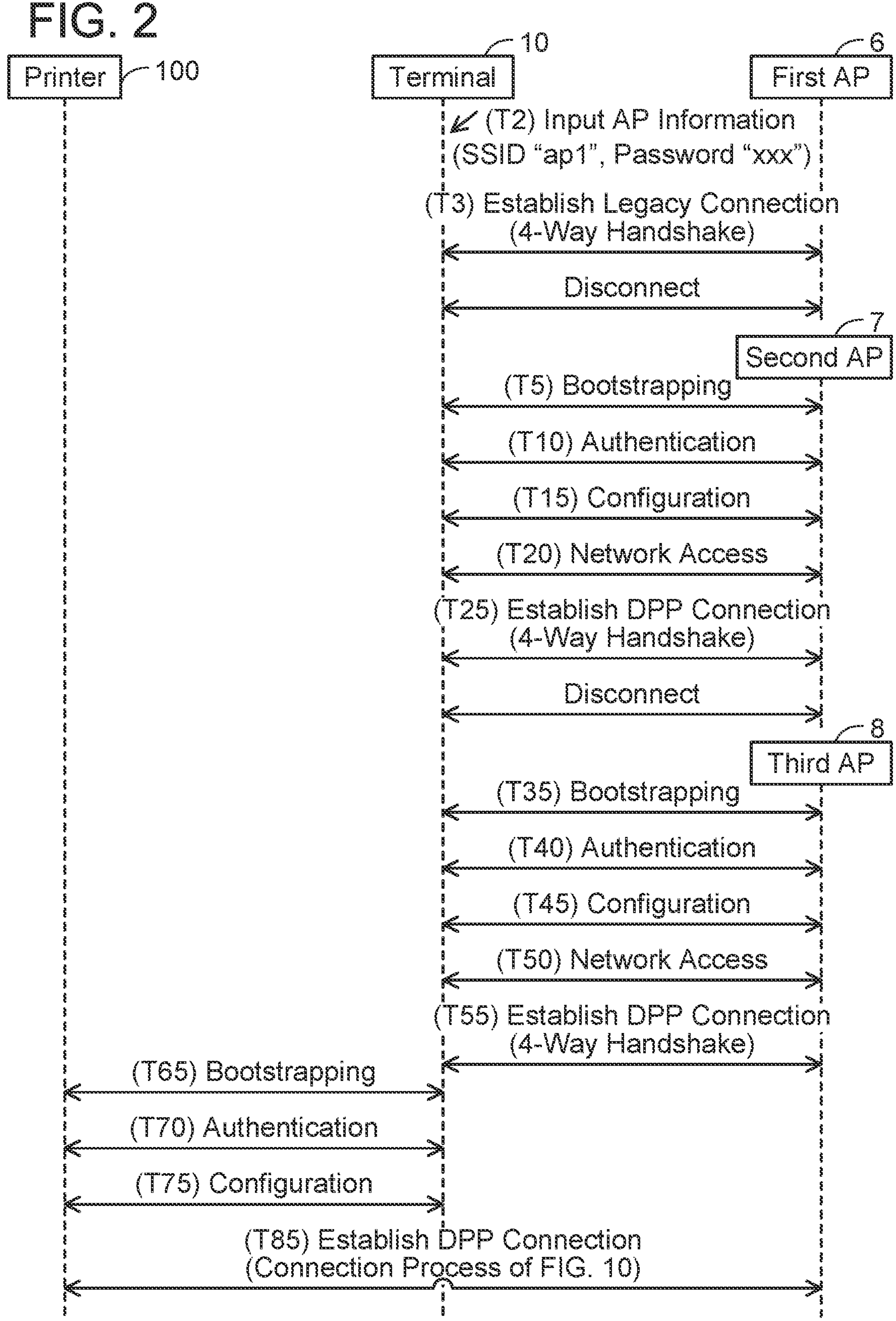
FIG. 2 shows an explanatory diagram for explaining an overview of an embodiment.

The terminal 10 is a portable terminal device such as a cellphone (e.g., a smartphone), a PDA, and a tablet PC. The terminal 10 may be a desktop PC, a laptop PC or the like.

The terminal 10 comprises a camera 15 and a Wi-Fi interface 16. Hereinafter, an interface will be denoted simply as "I/F". The camera 15 is a device for capturing an image of an object, and in this embodiment, it is used especially to capture a QR Code (registered trademark, DENSO WAVE INCORPORATED) for each of the AP 7 and AP 8 and the printer 100.

The Wi-Fi I/F 16 is a wireless interface configured to execute wireless communication in conformity with the Wi-Fi scheme (hereinafter termed "Wi-Fi communication"). The Wi-Fi scheme is a wireless communication scheme for executing wireless communication in conformity with 802.11 standard of IEEE (the Institute of Electrical and Electronics Engineers, Inc.) and standards complying thereto (such as 802.11a, 11b, 11g, 11n, 11ac, etc.). The Wi-Fi I/F 16 especially supports Device Provisioning Protocol (DPP) that has been established by the Wi-Fi Alliance The DPP is described in the standard "Device Provisioning Protocol Technical Specification Version 1.1" created by the Wi-Fi Alliance, and is a wireless communication scheme for easily establishing a Wi-Fi connection between a pair of devices (such as between the printer 100 and the AP 7 or 8) by using the terminal 10.

(Configuration of Printer 100)

The printer 100 is a peripheral device (e.g., a peripheral device of the terminal 10, etc.) capable of executing a print function. The printer 100 comprises an operation unit 112, a display unit 114, a Wi-Fi I/F 116, a print executing unit 118, and a controller 130. The units 112 to 130 are connected to a bus line (reference number omitted).

The operation unit 112 comprises a plurality of keys. The user can input various instructions to the printer 100 by operating the operation unit 112. The display unit 114 is a display for displaying various types of information. The display unit 114 also includes touchscreen function (i.e., operation unit) which receives instructions from the user. The Wi-Fi I/F 116 is the same as the Wi-Fi I/F 16 of the terminal 10. That is, the Wi-Fi I/F 116 supports the DPP. Further, a MAC address "macpr" is assigned to the Wi-Fi I/F 116. The print executing unit 118 comprises a printing mechanism of ink jet scheme, laser scheme, or the like.

The controller 130 comprises a CPU 132 and a memory 134. The CPU 132 executes various processes in accordance with a program 136 stored in the memory 134. The memory 134 is constituted of a volatile memory, a non-volatile memory, and the like.

(Configurations of AP 6, AP 7 and AP 8)

Each of the AP 6, AP 7 and AP 8 supports the DPP. The first AP 6 is allocated with a MAC address "macap1" Similarly, the second AP 7 is allocated with a MAC address "macap2" and the third AP 8 is allocated with a MAC address "macap3". Further, the first AP 6 stores AP information including a Service Set Identifier (SSID) "ap1" for identifying the first AP 6 and a password "xxx" to be used in a wireless network formed by the first AP 6. Similarly, the second AP 7 stores AP information including a SSID "ap2" and a password "yyy", and the third AP 8 stores AP information including a SSID "ap3" and a password "zzz".

(Overview of Embodiment; FIG. 2)

Next, an overview of the present embodiment will be described with reference to FIG. 2. In the present embodiment, an establishment of a Wi-Fi connection between the terminal 10 and the first AP 6 is implemented by the first AP 6 and the terminal 10 executing communication using the AP information of the first AP 6, and further, an establishment of a Wi-Fi connection between the printer 100 and the second AP 7 or the third AP 8 is implemented by the respective devices 7, 8, 10, 100 executing communication in conformity with the DPP. Unless otherwise stated, operations executed by a CPU of each device (such as the CPU 132) will be described with corresponding device (such as the printer 100) as a subject of action instead of describing the operations with the CPU as the subject of action for facilitating understanding.

In T2, the user inputs the AP information of the first AP 6 (SSID "ap1" and password "xxx") to the terminal 10. Thus, in T3, the terminal 10 and the first AP 6 execute 4-way handshake communication. In a variant, Simultaneous Authentication of Equals (SAE, so-called "Dragonfly") communication may be used instead of the 4-way handshake communication. In at least a part of processes of the 4-way handshake communication, the terminal 10 and the first AP 6 communicate encrypted information that is encrypted using the password "xxx". Then, the Wi-Fi connection is established between the terminal 10 and the first AP 6 in a case where decryption of the encrypted information succeeds, thereby the terminal 10 participates in the wireless network formed by the first AP 6 as a child station. In this case, the terminal 10 stores the SSID "ap1" identifying the first AP 6. Hereinbelow, a Wi-Fi connection established using the AP information will be termed "Legacy connection".

Next, the terminal 10 disconnects the Legacy connection with the first AP 6 and executes processes for establishing a Wi-Fi connection with the second AP 7. In T5, the terminal 10 executes Bootstrapping in conformity with the DPP (hereinafter simply termed "BS") with the second AP 7. This BS is a process of providing information to be used in Authentication (hereinafter simply termed "Auth") of T10 to be described later from the second AP 7 to the terminal 10 in response to the QR code adhered to the second AP 7 being captured by the terminal 10.

In T10, the terminal 10 uses the information obtained in the BS of T5 to execute Auth in conformity with the DPP with the second AP 7. This Auth is a process for the terminal 10 and the second AP 7 to authenticate their communication counterparts.

In T15, the terminal 10 executes Configuration in conformity with the DPP (hereinafter simply termed "Config") with the second AP 7. This Config is a process of sending information for the second AP 7 to establish a Wi-Fi connection to the second AP 7. Specifically, the terminal 10 creates a Configuration Object for second AP (hereinafter, the Configuration Object will simply be termed "CO") and sends the CO for second AP to the second AP 7. As a result, the CO for second AP is stored in the second AP 7.

In T20, the terminal 10 executes Network Access in conformity with the DPP (hereinafter simply termed "NA") with the second AP 7. The terminal 10 creates a second CO for terminal in this NA. Further, the terminal 10 and the second AP 7 use the second CO for terminal and the CO for second AP to share a connection key for establishing the Wi-Fi connection between the terminal 10 and the second AP 7.

In T25, the terminal 10 and the second AP 7 execute the 4-way handshake communication. In a variant, the SAE communication may be used instead of the 4-way handshake communication. In at least a part of the processes of the 4-way handshake communication, the terminal 10 and the second AP 7 communicate encrypted information that is encrypted using the connection key shared in the NA of T20. Then, the Wi-Fi connection is established between the terminal 10 and the second AP 7 in a case where decryption of the encrypted information succeeds, thereby the terminal 10 participates in a wireless network formed by the second AP 7 as a child station. In this case, the terminal 10 stores the SSID "ap2" identifying the second AP 7. Hereinbelow, a Wi-Fi connection established in conformity with the DPP will be termed "DPP connection".

Next, the terminal 10 disconnects the DPP connection with the second AP 7 and executes processes for establishing a DPP connection with the third AP 8. In T35, the terminal 10 executes BS in conformity with the DPP with the third AP 8. This BS is a process of providing information to be used in Auth of T40 to be described later from the third AP 8 to the terminal 10 in response to the QR Code adhered to the third AP 8 being captured by the terminal 10.

In T40, the terminal 10 uses the information obtained in the BS of T35 to execute Auth in conformity with the DPP with the third AP 8. This Auth is a process for the terminal 10 and the third AP 8 to authenticate their communication counterparts.

In T45, the terminal 10 executes Config in conformity with the DPP with the third AP 8. This Config is a process of communicating information for the third AP 8 to establish the DPP connection to the third AP 8. Specifically, the terminal 10 creates a third CO for AP and sends the third CO for AP to the third AP 8. As a result, the third CO for AP is stored in the third AP 8.

In T50, the terminal 10 executes NA in conformity with the DPP with the third AP 8. The terminal 10 creates a third CO for terminal in this NA. Further, the terminal 10 and the third AP 8 use the third CO for terminal and the third CO for AP to share a connection key for establishing the DPP connection between the terminal 10 and the third AP 8.

In T55, the terminal 10 and the third AP 8 use the connection key shared in the NA of T50 to execute the 4-way handshake communication, thereby the DPP connection is established between the terminal 10 and the third AP 8, and the terminal 10 participates in a wireless network formed by the third AP 8 as a child station. In this case, the SSID "ap3" identifying the third AP 8 is stored in the terminal 10. In a variant, the SAE communication may be used instead of the 4-way handshake communication.

Next, in T65, the terminal 10 executes BS in conformity with the DPP with the printer 100. The BS is a process of providing, from the printer 100 to the terminal 10, information that is used in Auth of T70 to be described later in response to the QR Code displayed on the printer 100 being captured by the terminal 10.

In T70, the terminal 10 executes Auth in conformity with the DPP with the printer 100 by using the information obtained in the BS of T65. This Auth is a process for the terminal 10 and the printer 100 to authenticate their communication counterparts.

In T75, the terminal 10 executes Config in conformity with the DPP with the printer 100. This Config is a process of sending information for the printer 100 to establish a Wi-Fi connection to the printer 100. Specifically, the terminal 10 creates a CO for printer for each of the AP 6, AP7 and AP8 and sends the COs for printer to the printer 100.

In T85, the printer 100 uses one of the COs for printer received from the terminal 10 to execute a connection process to be described later (FIG. 10). In case of FIG. 2, the printer 100 uses the third CO for printer corresponding to the third AP 8 among the COs for printer received from the terminal 10 and establishes a DPP connection with the third AP 8. By doing so, the printer 100 participates in the wireless network formed by the third AP 8 as a child station.

In the DPP, the user does not need to input the AP information (i.e., the SSID and password) to the printer 100 to establish a DPP connection between the printer 100 and an AP (such as the third AP 8). As such, the user can easily cause the DPP connection (i.e., Wi-Fi connection) to be established between the printer 100 and an AP.

Figure 3:
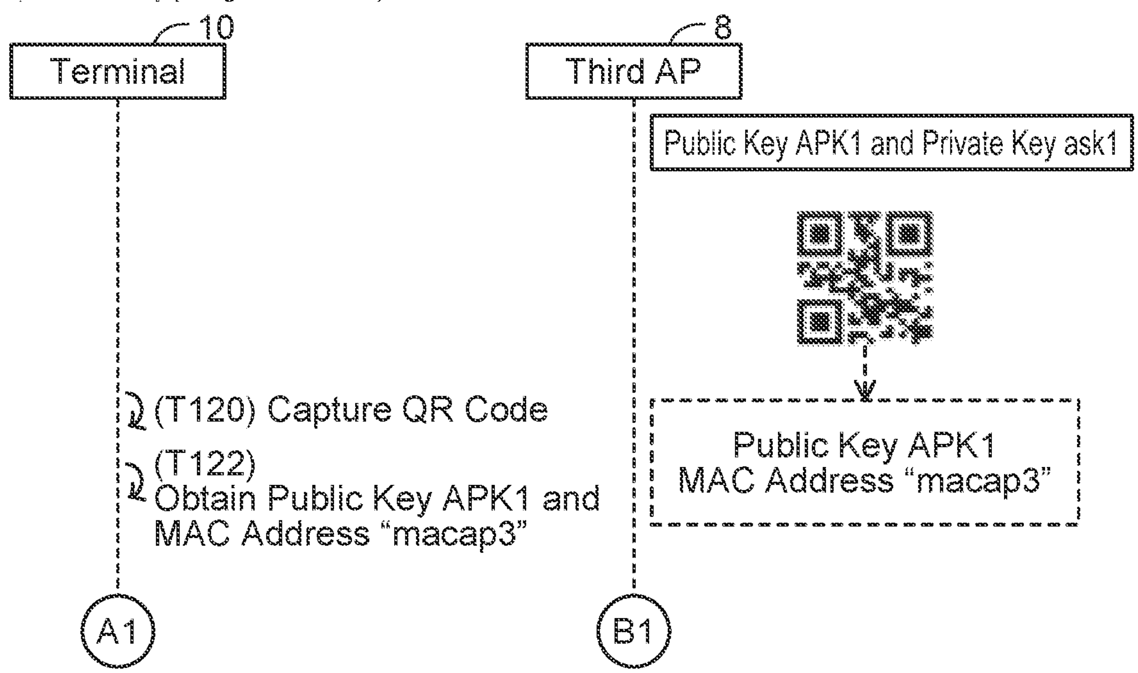
FIG. 3 shows a sequence diagram of a Bootstrapping process with an AP.

(Bootstrapping (BS) with AP; FIG. 3)

Next, details of respective processes executed in T35 to T50 and T65 to T85 of FIG. 2 will be described with reference to FIGS. 3 to 12. Processes of T5 to T25 of FIG. 2 are identical to processes of T35 to T50 except that the processes such as the BS are executed with the second AP 7, thus detailed description thereof will be omitted.

Firstly, the process of the BS executed between the terminal 10 and the third AP 8 in T35 of FIG. 2 will be described with reference to FIG. 3. In an initial state of FIG. 3, the third AP 8 stores in advance a public key APK1 and a private key ask1 of the third AP 8. Further, the QR Code obtained by encoding the public key APK1 of the third AP 8 and MAC address "macap3" of the third AP 8 is adhered to a body of the third AP 8.

The terminal 10 activates the camera 15 in response to an operation by the user, and captures an image of the QR Code adhered to the body of the third AP 8 using the camera 15 in T120. Then, in T122, the terminal 10 decodes the captured QR Code and obtains the public key APK1 and the MAC address "macap3". When the process of T122 is completed, the process of FIG. 3 is terminated.

Figure 4:
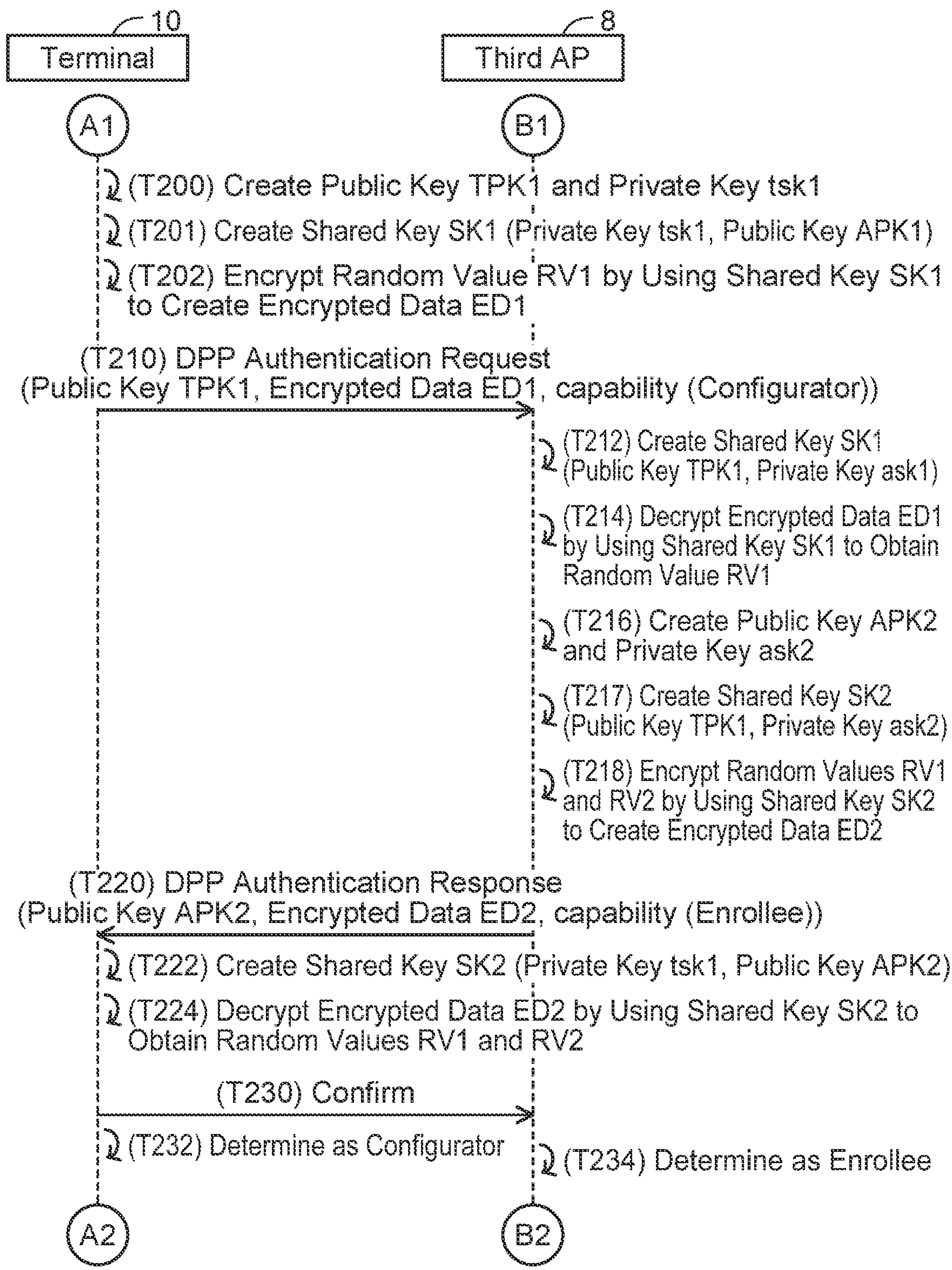
FIG. 4 shows a sequence diagram of an Authentication process with the AP.

(Authentication (Auth) with AP; FIG. 4)

Next, the process of the Auth executed between the terminal 10 and the third AP 8 in T40 of FIG. 2 will be described with reference to FIG. 4.

In T200, terminal 10 creates a public key TPK1 and a private key tsk1 of the terminal 10. Then, in T201, the terminal 10 creates a shared key SK1 in conformity with Elliptic curve Diffie—Hellman key exchange (ECDH) by using the created private key tsk1 and the public key APK1 of the third AP 8 obtained in T122 of FIG. 3. After this, in T202, the terminal 10 creates encrypted data ED1 by encrypting a random value RV1 using the created shared key SK1.

In T210, the terminal 10 sends a DPP Authentication Request (hereinafter simply termed "AReq") to the third AP 8 with the MAC address "macap3" obtained in T122 of FIG. 3 as a destination via the Wi-Fi I/F 16. The AReq is a signal requesting the third AP 8 to execute authentication, and includes the public key TPK1 of the terminal 10 created in T200, the encrypted data ED1 created in T202, and a capability of the terminal 10.

A capability is information that is pre-designated in a device supporting the DPP and includes a value which is one of: a value indicating that the device is capable of operating only as a Configurator in conformity with the DPP, a value indicating that the device is capable of operating only as an Enrollee in conformity with the DPP, and a value indicating that the device is capable of operating as both the Configurator and the Enrollee. The Configurator refers to a device configured to send a CO that is to be used in NA (e.g., T50 of FIG. 2) to the Enrollee in Config (e.g., T45 of FIG. 2). On the other hand, the Enrollee refers to a device that receives the CO that is to be used in the NA from the Configurator in the Config. As described above, in this embodiment, the terminal 10 creates the CO for second AP, the third CO for AP and the first to third CO for printer and sends them respectively to the second AP 7, third AP 8 and the printer 100. As such, the capability of the terminal 10 includes the value indicating that it is capable of operating only as the Configurator.

In T210, the third AP 8 receives the AReq from the terminal 10. As described above, this AReq is sent with the MAC address "macap3" of the third AP 8 as the destination. Therefore, the third AP 8 can appropriately receive this AReq from the terminal 10.

Next, the third AP 8 executes the following process for authenticating the sender of the AReq (i.e., the terminal 10). Specifically, in T212, the third AP 8 creates a shared key SK1 in conformity with the ECDH by using the public key TPK1 of the terminal 10 in the AReq and the private key ask1 of the third AP 8. Here, the shared key SK1 created by the terminal 10 in T201 is the same as the shared key SK1 created by the third AP 8 in T212. Therefore, in T214, the third AP 8 can appropriately decrypt the encrypted data ED1 in the AReq by using the created shared key SK1, as a result of which the third AP 8 can obtain the random value RV1. In a case where the decryption of the encrypted data ED1 succeeds, the third AP 8 determines that the sender of the AReq is the device that captured the QR Code of the third AP 8, that is, determines that the authentication has succeeded, and executes processes from T216 onward. On the other hand, in a case where the decryption of the encrypted data ED1 does not succeed, the third AP 8 determines that the sender of the AReq is not the device that captured the QR Code of the third AP 8, that is, determines that the authentication has failed, and does not execute the processes from T216 onward.

In T216, the third AP 8 creates a new public key APK2 and a new private key ask2 of the third AP 8. In a variant, the third AP 8 may store the public key APK2 and the private key ask2 in advance. Next, in T217, the third AP 8 creates a shared key SK2 in conformity with the ECDH by using the public key TPK1 of the terminal 10 in the AReq of T210 and the created private key ask2 of the third AP 8. Then, in T218, the third AP 8 encrypts the obtained random value RV1 and a new random value RV2 by using the created shared key SK2 to create encrypted data ED2.

In T220, the third AP 8 sends a DPP Authentication Response (hereinafter simply termed "ARes") to the terminal 10. This ARes includes the public key APK2 of the third AP 8 created in T216, the encrypted data ED2 created in T218, and a capability of the third AP 8. This capability includes the value indicating that the third AP 8 is capable of operating only as the Enrollee.

In T220, the terminal 10 executes the following process for authenticating the sender of this ARes (i.e., the third AP 8) in response to receiving the ARes from the third AP 8 via the Wi-Fi I/F 16. Specifically, in T222, the terminal 10 creates a shared key SK2 in conformity with the ECDH by using the private key tsk1 of the terminal 10 created in T200 and the public key APK2 of the third AP 8 in the ARes. Here, the shared key SK2 created by the third AP 8 in T217 is the same as the shared key SK2 created by the terminal 10 in T222. Therefore, in T224, the terminal 10 can appropriately decrypt the encrypted data ED2 in the ARes by using the created shared key SK2, as a result of which the terminal 10 can obtain the random values RV1 and RV2. In a case where the decryption of the encrypted data ED2 succeeds, the terminal 10 determines that the sender of the ARes is the device having the captured QR Code, that is, determines that the authentication has succeeded, and executes processes from T230 onward. On the other hand, in a case where the decryption of the encrypted data ED2 does not succeed, the terminal 10 determines that the sender of the ARes is not the device having the captured QR Code, that is, determines that the authentication has failed, and does not execute the processes from T230 onward.

In T230, the terminal 10 sends Confirm to the third AP 8 via the Wi-Fi I/F 16. The Confirm includes information indicating that the terminal 10 operates as the Configurator and the third AP 8 operates as the Enrollee. As a result, the terminal 10 determines to operate as the Configurator in T232, and the third AP 8 determines to operate as the Enrollee in T234. When the process of T234 is completed, the process of FIG. 4 is terminated. When the process of FIG. 4 is terminated, the terminal 10 discards the public key TPK1 and the private key tsk1.

Figure 5:
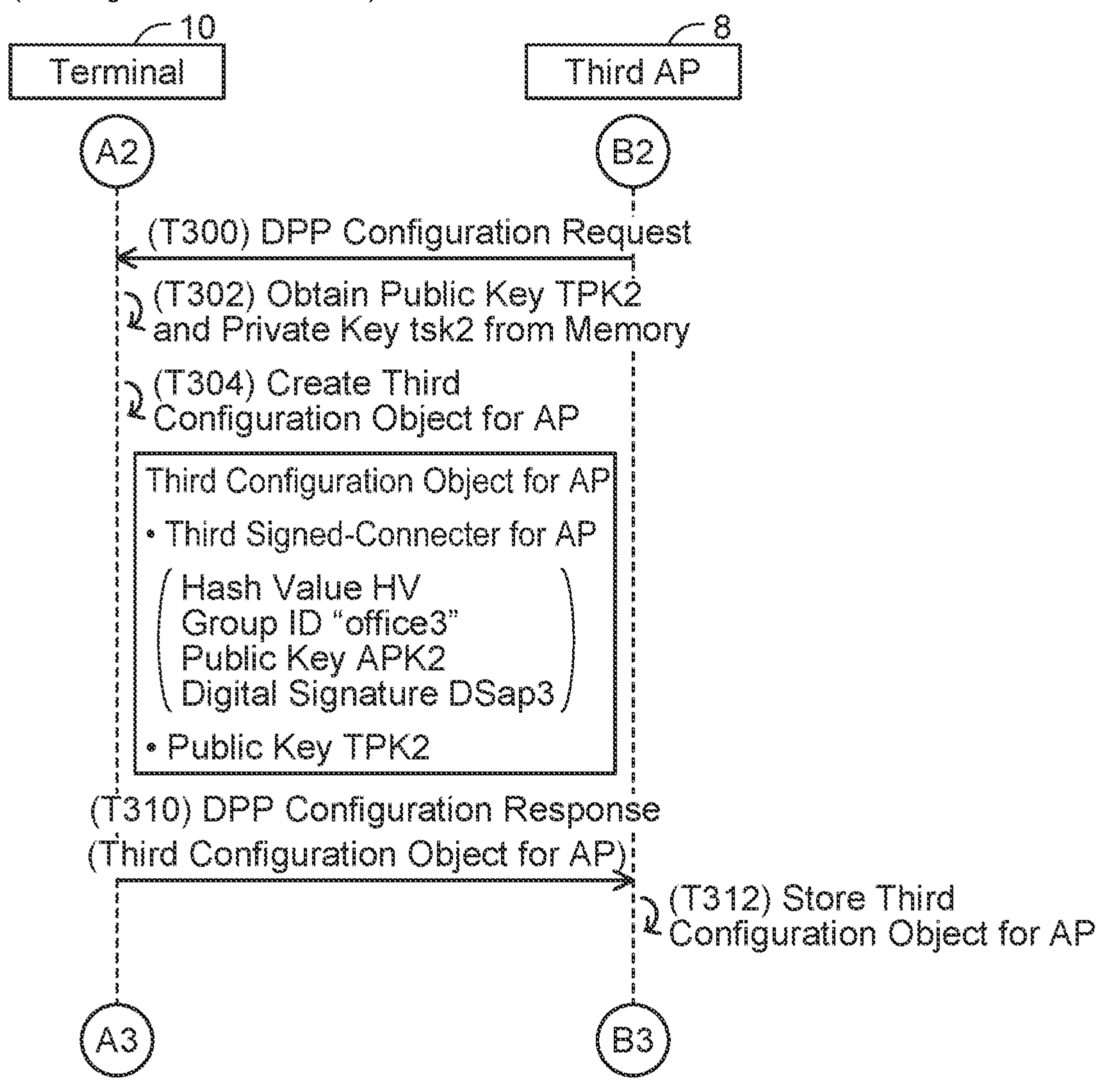
FIG. 5 shows a sequence diagram of a Configuration process with the AP.

(Configuration (Config) with AP; FIG. 5)

Next, the process of the Config executed between the terminal 10 and the third AP 8 in T45 of FIG. 2 will be described with reference to FIG. 5.

In T300, the third AP 8 sends a DPP Configuration Request (hereinafter simply termed "CReq") to the terminal 10. This CReq is a signal requesting a third CO for AP to be sent.

In T300, the terminal 10 receives the CReq from the third AP 8 via the Wi-Fi I/F 16. In this case, the terminal 10 obtains a public key TPK2 and a private key tsk2 from a memory (not shown) of the terminal 10 in T302. The public key TPK2 and the private key tsk2 is identical to the public key and the private key used upon creating the CO for second AP in the Config with the second AP 7 (T15 of FIG. 2) that had been executed before the Config with the third AP 8. Next, in T304, the terminal 10 creates a third CO for AP using the obtained private key tsk2. Specifically, the terminal 10 executes processes as follows.

Firstly, the terminal 10 creates a hash value HV by hashing the public key TPK2 of the terminal 10. Further, the terminal 10 creates a first value by hashing a combination of the hash value HV, a group ID "office3", and the public key APK2 of the third AP 8 in the ARes of T220 of FIG. 4. Then, the terminal 10 creates a digital signature DSap3 by encrypting the created first value in conformity with Elliptic Curve Digital Signature Algorithm (ECDSA) using the private key tsk2 of the terminal 10. As a result of this, the terminal 10 can create a Signed-Connector for third AP (hereinafter, a Signed-Connector will simply be termed "SC") including the hash value HV, the group ID "office3", the public key APK2 of the third AP 8, and the digital signature DSap3. Then, the terminal 10 creates the third CO for AP including the third SC for AP and the public key TPK2 of the terminal 10. The group ID "office3" is an ID for identifying the wireless network formed by the third AP 8. The group ID "office3" is inputted to the terminal 10 by the user.

In T310, the terminal 10 sends a DPP Configuration Response (hereinafter simply termed "CRes") including the third CO for AP to the third AP 8 via the Wi-Fi I/F 16.

In T310, the third AP 8 receives the CRes from the terminal 10. In this case, in T312, the third AP 8 stores the third CO for AP in this CRes. When the process of T312 is completed, the process of FIG. 5 is terminated.

(Network Access (NA) with AP; FIG. 6)

Next, the process of the NA executed between the terminal 10 and the third AP 8 in T50 of FIG. 2 will be described with reference to FIG. 6.

In T400, the terminal 10 creates a new public key TPK3 and private key tsk3 of the terminal 10. Then in T402, the terminal 10 crates a CO for third terminal using the private key tsk2 of the terminal 10 obtained in T302 of FIG. 5. Specifically, terminal 10 executes processes as follows.

Firstly, the terminal 10 creates the hash value HV by hashing the public key TPK2 of the terminal 10. Further, the terminal 10 creates a second value by hashing a combination of the hash value HV, the group ID "office3", and the public key TPK3 of the terminal 10 created in T400. Then, the terminal 10 creates a digital signature DSte3 by encrypting the created second value in conformity with the ECDSA using the private key tsk2 of the terminal 10. As a result of this, the terminal 10 can create a third SC for terminal including the hash value HV, the group ID "office3", the public key TPK3 of the terminal 10, and the digital signature DSte3. The hash value HV and the group ID "office3" included in the third SC for terminal are respectively identical to the hash value HV and the group ID "office3" included in the third SC for AP. The public key TPK3 and the digital signature DSte3 included in the third SC for terminal are respectively different from the public key APK2 and the digital signature DSap3 included in the third SC for AP. Further, the terminal 10 creates a third CO for terminal including the third SC for terminal and the public key TPK2 of the terminal 10 and stores the same.

In T410, the terminal 10 sends a DPP Peer Discovery Request (hereinafter simply termed "DReq") including the third SC for terminal to the third AP 8 via the Wi-Fi I/F 16. This DReq is a signal requesting the third AP 8 to execute authentication and send the third SC for AP.

In response to receiving the DReq from the terminal 10 in T410, the third AP 8 executes processes for authenticating a sender of the DReq (i.e., the terminal 10) and the respective information in the DReq (i.e., the hash value HV, "office3", and public key TPK3). Specifically, in T412, the third AP 8 firstly executes a first AP determination process regarding whether the hash value HV and the group ID "office3" in the third SC for terminal respectively match the hash value HV and the group ID "office3" in the third SC for AP. In case of FIG. 6, the third AP 8 determines "matched" in the first AP determination process, thus a determination is made that the authentication of the sender of the DReq (i.e., the terminal 10) succeeded. The determination of "matched" in the first AP determination process means that the third SC for terminal and the third SC for AP were created by a same device (i.e., the terminal 10). As such, the third AP 8 also determines that the authentication of a creator of the third SC for terminal (i.e., the terminal 10) succeeded. Further, the third AP 8 decrypts the digital signature DSte3 in the third SC for terminal using the public key TPK2 of the terminal 10 included in the third CO for AP. In the case of FIG. 6, the decryption of the digital signature DSte3 succeeds, so the third AP 8 executes a second AP determination process regarding whether the second value obtained by decrypting the digital signature DSte3 and a value obtained by hashing the respective information in the third SC for terminal (i.e., the hash value HV, "office3", and public key TPK3) match. In the case of FIG. 6, the third AP 8 determines "matched" in the second AP determination process, thus a determination is made that the authentication of the respective information in the DReq succeeded, and processes from T414 are executed. The determination of "matched" in the second AP determination process means that the respective information in the third SC for terminal have not been tampered by a third party after the third CO for terminal was stored in the terminal 10. An authentication using the digital signature to be described later is also a process for confirming that information has not been altered by a third party. On the other hand, in any of cases where: "not matched" is determined in the first AP determination process; the decryption of the digital signature DSte3 fails; and "not matched" is determined in the second AP determination process, the third AP 8 determines that the authentication failed, and does not execute the processes from T414.

Next, in T414, the third AP 8 creates a connection key (i.e., a shared key) CK1 in conformity with the ECDH using the public key TPK3 of the third SC for terminal and the private key ask2 of the third AP 8.

In T420, the third AP 8 sends a DPP Peer Discovery Response (hereinafter simply termed "DRes") including the third SC for AP to the terminal 10.

In response to receiving the DRes from the third AP 8 via the Wi-Fi I/F 16 in T420, the terminal 10 executes the processes for authenticating the sender of the DRes (i.e., the third AP 8) and the respective information (i.e., the hash value HV, "office3", and public key APK2) in the DRes. Specifically, the terminal 10 firstly executes in T422 a first 1B determination process regarding whether the hash value HV and the group ID "office3" in the third SC for AP respectively match the hash value HV and the group ID "office3" in the third SC for terminal. In the case of FIG. 6, since the terminal 10 determines "matched" in the first TE determination process, it determines that the authentication of the sender of the DRes (i.e., the third AP 8) succeeded. The determination of "matched" in the first 1B determination process means that the third SC for terminal and the third SC for AP were created by the same device (i.e., the terminal 10). As such, the terminal 10 also determines that the authentication of the creator of the third SC for terminal (i.e., the terminal 10) succeeded. Further, the terminal 10 decrypts the digital signature DSap3 in the third SC for AP using the public key TPK2 of the terminal 10 included in the third CO for terminal. In the case of FIG. 6, the decryption of the digital signature DSap3 succeeds, so the terminal 10 executes a second TE determination process regarding whether the first value obtained by decrypting the digital signature DSap3 and a value obtained by hashing the respective information in the third SC for AP (i.e., the hash value HV, "office3", and public key APK2) match. In the case of FIG. 6, the terminal 10 determines "matched" in the second TE determination process, thus a determination is made that the authentication of the respective information in the DRes succeeded, and processes from T424 are executed. On the other hand, in any of cases where: "not matched" is determined in the first 1B determination process; the decryption of the digital signature DSap3 fails; and "not matched" is determined in the second TE determination process, the terminal 10 determines that the authentication failed, and does not execute the processes from T424.

In in T424, the terminal 10 creates a connection key CK1 in conformity with the ECDH using the private key tsk3 of the terminal 10 and the public key APK2 in the third SC for AR Here, the connection key CK1 created by the third AP 8 in T414 and the connection key CK1 created by the terminal 10 in T424 are identical. Thus, the connection key CK1 for establishing the DPP connection is shared between the terminal 10 and the third AP 8.

After the connection key CK1 has been shared between the terminal 10 and the third AP 8, the terminal 10 and the third AP 8 execute the 4-way handshake communication (T55 of FIG. 2) using the connection key CK1 in T425. As a result, the DPP connection is established between the terminal 10 and the third AP 8. Thus, the terminal 10 participates as a child station in the wireless network in which the third AP 8 operates as a parent station and identified by the group ID "office3". In a case where the DPP connection with the third AP 8 is established, the terminal 10 stores the SSID "ap3" of the third AP 8 in association with the third CO for terminal.

Figure 7:
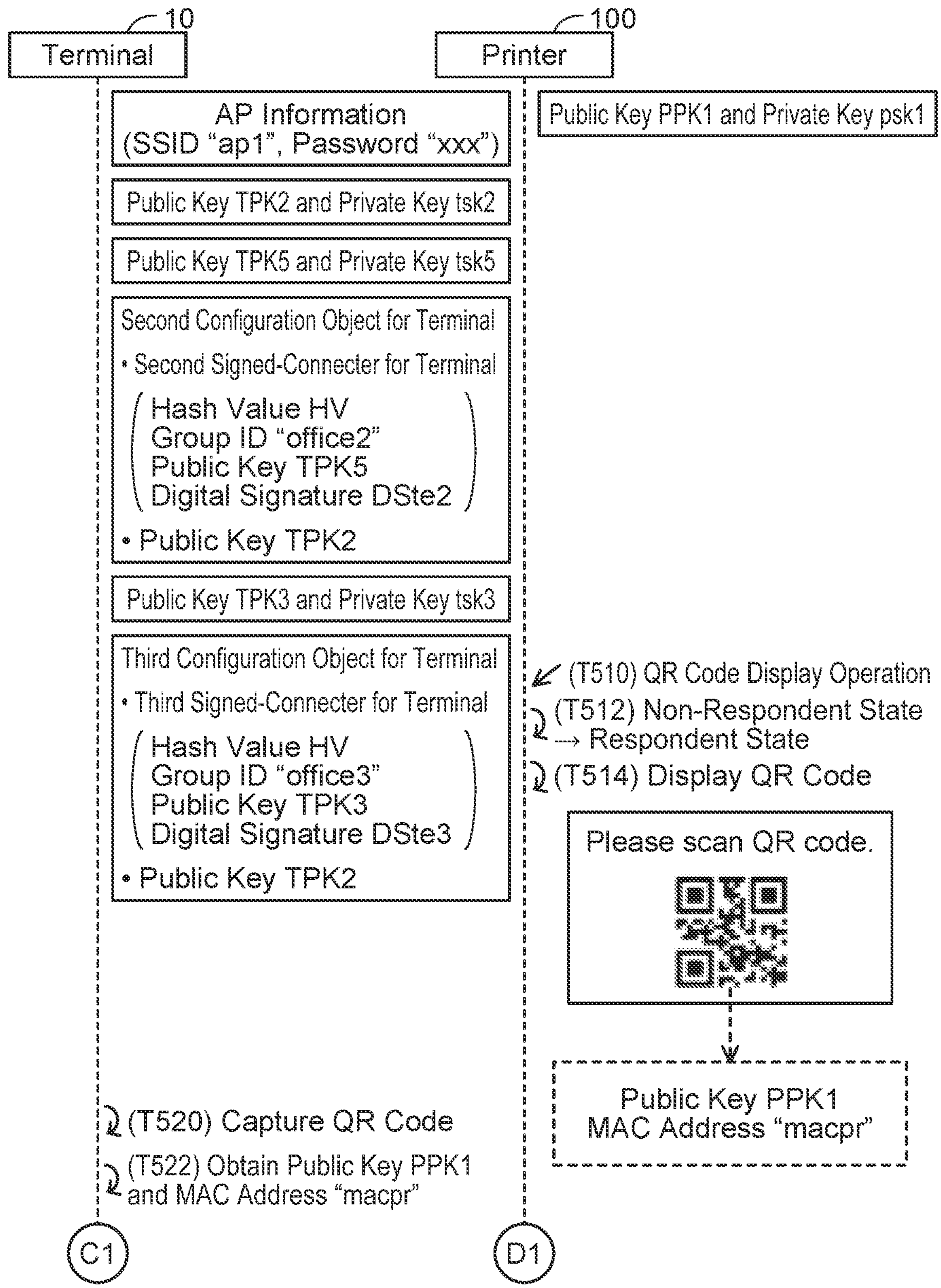
FIG. 7 shows a sequence diagram of a Bootstrapping process with a printer.

(Bootstrapping (BS) with Printer 100; FIG. 7)

Next, the process of the BS executed between the terminal 10 and the printer 100 in T65 of FIG. 2 will be described with reference to FIG. 7. In an initial state of FIG. 7, the terminal 10 stores the AP information of the first AP 6 (the SSID "ap1" and password "xxx"), the public key TPK2 and the private key tsk2 of the terminal 10 (see T302 of FIG. 5), a public key TPK5 and a private key tsk5 of the terminal 10, the second CO for terminal (see T20 of FIG. 2), the public key TPK5 and a private key tsk3 of the terminal 10 (see T400 of FIG. 6), and the third CO for terminal (see T50 of FIG. 2 and T402 of FIG. 6). Here, the public key TPK5 and the private key tsk5 are the public key and the private key that were used upon creating the second CO for terminal in the NA with the second AP 7. Processes for creating the public key TPK5 and the private key tsk5 are identical to process of T400 of FIG. 6. The second CO for terminal includes a second SC for terminal and the public key TPK2. The second SC for terminal includes the hash value HV, a group ID "office2", the public key TPK5 of the terminal 10, and a digital signature DSte2. The group ID "office2" is an ID identifying the wireless network formed by the second AP 7. The digital signature DSte2 is created by using the hash value HV, the group ID "office2", the public key TPK5 of the terminal 10, and the private key tsk2 of the terminal 10.

Further, the printer 100 stores a public key PPK1 and a private key psk1 of the printer 100 in memory 134 of the printer 100 in advance.

In response to an operation for displaying the QR Code being performed by the user in T510, the printer 100 shifts a state of the printer 100 from a non-respondent state to a respondent state in T512. In the non-respondent state, the Wi-Fi I/F 116 does not send the ARes even if the Wi-Fi I/F 116 receives the AReq from the terminal 10. In the respondent state, the Wi-Fi I/F 116 sends the ARes to the terminal 10 in response to receiving the AReq from the terminal 10. That is, by shifting from the non-respondent state to the respondent state, a state of printer 100 is a state capable of executing the Auth (T70 of FIG. 2). Specifically, in the present embodiment, in the non-respondent state, despite having received a signal from an external device, the Wi-Fi I/F 116 does not send this signal to the CPU 132. Further, in the respondent state, when receiving a signal from an external device, the Wi-Fi I/F 116 sends this signal to the CPU 132 and sends a response to this signal. Since the respondent state is a state in which the CPU 132 processes the signal received from the external device, a processing load is high as compared to the non-respondent state. In a variant, the non-respondent state may be a state in which power is not supplied to the Wi-Fi I/F 116 and the respondent state may be a state in which the power is supplied to the Wi-Fi I/F 116. Further, in another variant, the non-respondent state may be a state in which the Wi-Fi I/F 116 receives the AReq from the external device but does not send the CPU 132 a notification indicating that the AReq has been received, and the respondent state may be a state in which the Wi-Fi I/F 116 sends the CPU 132 the notification indicating that the AReq has been received, in response to receiving the AReq from the external device.

Next, in T514, the printer 100 displays the QR Code on the display unit 114. The QR Code is a code image obtained by coding the public key PPK1 stored in the memory 134 in advance and the MAC address "macpr" of the printer 100. The QR Code may be created by the printer 100 in T514 or may be stored in advance in the memory 134 at the time of shipping of the printer 100.

In T520, the terminal 10 captures an image of the QR Code displayed on the printer 100 using the camera 15. Then, in T522, the terminal 10 decodes the captured QR Code and obtains the public key PPK1 and the MAC address "macpr". When the process of T522 is completed, the process of FIG. 7 is terminated.

Figure 8:
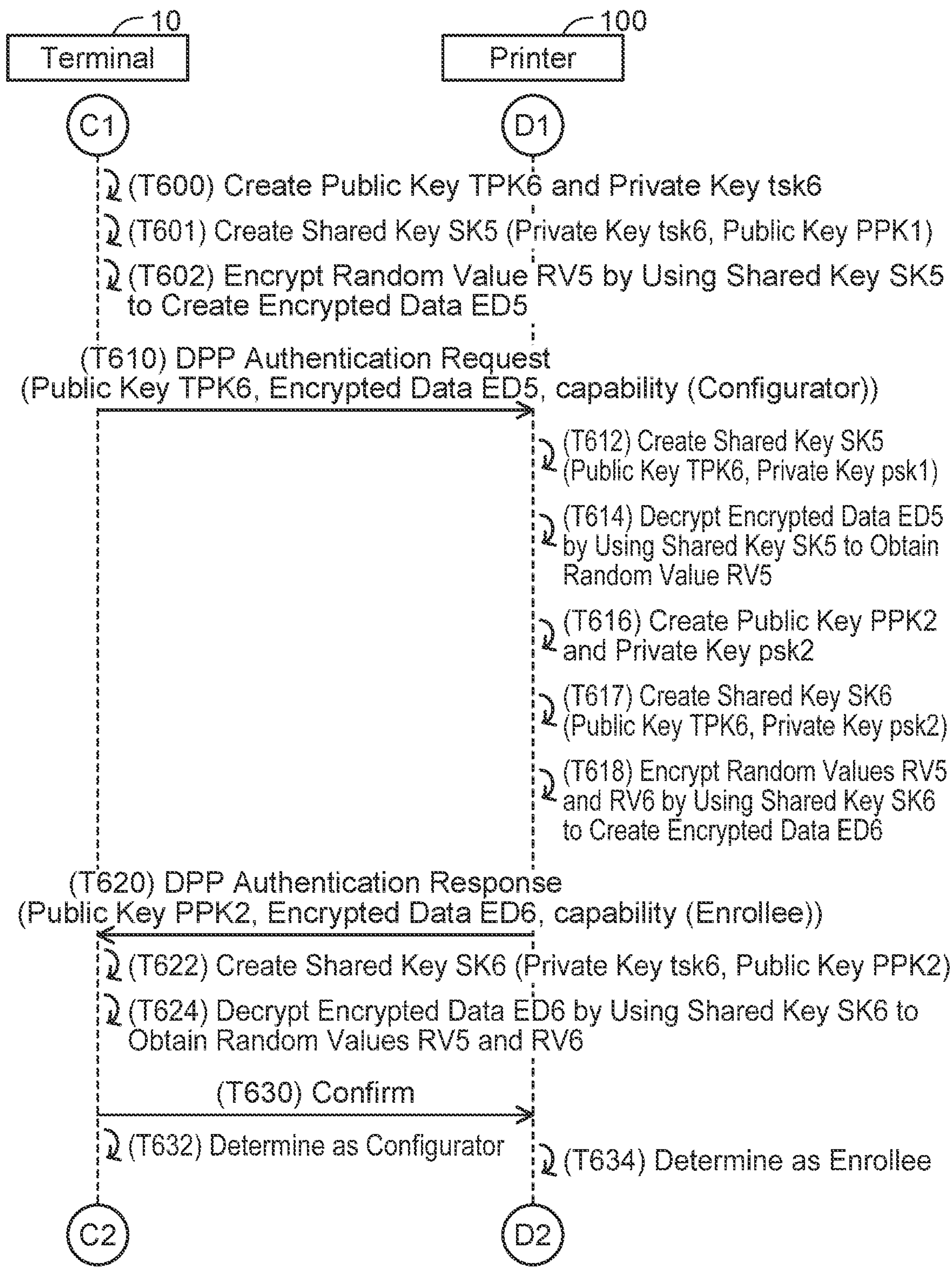
FIG. 8 shows a sequence diagram of an Authentication process with the printer.

(Authentication (Auth) with Printer 100; FIG. 8)

Next, the process of the Auth executed between the terminal 10 and the printer 100 in T70 of FIG. 2 will be described with reference to FIG. 8.

In T600, terminal 10 creates a new public key TPK6 and a new private key tsk6 of the terminal 10, then, in T601, the terminal 10 creates a shared key SK5 in conformity with the ECDH by using the created private key tsk6 and the public key PPK1 of the printer 100 obtained in T522 of FIG. 7. After this, in T602, the terminal 10 creates encrypted data ED5 by encrypting a random value RV5 using the created shared key SK5.

In T610, the terminal 10 sends an AReq to the printer 100 with the MAC address "macpr" obtained in T522 of FIG. 7 as a destination via the Wi-Fi I/F 16. This AReq includes the public key TPK6 of the terminal 10 created in T600, the encrypted data ED5 created in T602, and the capability of the terminal 10. This capability includes the value indicating that the terminal 10 is capable of operating only as the Configurator.

In T610, the printer 100 receives the AReq from the terminal 10 via the Wi-Fi I/F 116. This AReq is sent with the MAC address "macpr" of the printer 100 as the destination, thus the printer 100 can appropriately receive this AReq.

Next, the printer 100 executes the processes of T612 and T614 for authenticating the sender of the AReq (i.e., the terminal 10). Processes of T612 and T614 are identical to processes of T212 and T214 of FIG. 4 except that the processes of T612 and T614 is subject to the printer 100 and different key and encrypted data is used. That is, the printer 100 creates a shared key SK5 using the public key TPK6 and the private key psk1 in T612, and decrypts the encrypted data ED5 in the AReq using the shared key SK5 in T614. In this case, the printer 100 determines that the authentication has been succeeded, and executes processes from T616 onward.

In T616, the printer 100 creates a new public key PPK2 and a new private key psk2 of the printer 100. In a variant, the public key PPK2 and the private key psk2 may be stored in the memory 134 in advance. Processes of T617 and T618 executed thereafter are identical to processes of T217 and T218 of FIG. 4 except that their subject of action is the printer 100 and the data used herein (such as the key and the encrypted data) is different. That is, the printer 100 creates a shared key SK6 using the public key TPK6 and the private key psk2 in T617, and encrypts random value RV5, RV6 using the shared key SK6 in T618 to create encrypted data ED6.

In T620, the printer 100 sends an ARes to the terminal 10 via the Wi-Fi I/F 116. This ARes includes the public key PPK2 of the printer 100 created in T616, the encrypted data ED6 created in T618, and the capability of the printer 100. This capability includes the value indicating that the printer 100 is capable of operating only as the Enrollee.

Processes of T622 to T634 are identical to processes of T222 to T234 of FIG. 4 except that a communication target is the printer 100 and the data used herein (such as the key and the encrypted data) is different. As a result of T630, the terminal 10 determine to operate as the Configurator and the printer 100 determines to operate as the Enrollee. When the process of T634 is completed, the process of FIG. 8 is terminated. When the process of FIG. 8 is completed, the terminal 10 discards the public key TPK6 and the private key tsk6.

(Configuration (Config) with Printer 100; FIG. 9)

Next, the process of the Config executed between the terminal 10 and the printer 100 in T75 of FIG. 2 will be described with reference to FIG. 9.

In T700, the printer 100 sends a CReq to the terminal 10 via the Wi-Fi I/F 116. The CReq is a signal requesting a CO for Printer to be sent.

The terminal 10 receives the CReq from the printer 100 via the Wi-Fi I/F 16 in T700. In this case, the terminal 10 obtains the public key TPK2 and the private key tsk2 of the terminal 10 from the memory (not shown) of the terminal 10 in T702.

In T704*a* to T704*c*, the terminal 10 creates a CO for printer. In T704*a*, the terminal 10 creates a first CO for printer corresponding to the first AP 6. The first CO for printer includes the SSID “ap1” in the AP information of the first AP 6, security information, and an AKM “psk”. The security information relates to security of the Legacy connection which the terminal 10 establishes, and includes the password “xxx” in the AP information of the first AP 6 and other relation information (such as information indicating whether to use the password to establish the Legacy connection and information indicating a length and a configuration restriction of the password (i.e., a letter string)). The terminal 10 can establish the Legacy connection with an AP with which the security information matches. In other words, the terminal 10 cannot establish the Legacy connection with an AP with which the security information does not match. The AKM “psk” is a value indicating that the first CO for printer is a CO for establishing the Legacy connection.

In T704*b*, the terminal 10 creates a second CO for printer corresponding to the second AP 7. Specifically, the terminal 10 firstly creates a hash value HV by hashing the public key TPK2 of the terminal 10. Further, the terminal 10 generates a third value by hashing a combination of the hash value HV, the group ID “office2”, and the public key PPK2 of the printer 100 in the ARes of T620 of FIG. 8. Then, the terminal 10 creates a digital signature DSpr2 by encrypting the created third value in conformity with the ECDSA by using the private key tsk2 of the terminal 10. Accordingly, the terminal 10 creates a second SC for printer including the hash value HV, the group ID “office2”, the public key PPK2 of the printer 100, and the digital signature DSpr2. Further, the terminal 10 obtains the SSID “ap2” of the second AP 7 stored in association with the second CO for terminal including the group ID “office 2” from the memory (not shown) of the terminal 10. Then, the terminal 10 creates the second CO for printer including the second SC for printer, the public key TPK2 of the terminal 10, the SSID “ap2”, and an AKM “dpp”. The AKM “dpp” is a value indicating that the second CO for printer is a CO for establishing the DPP connection.

In T704*c*, the terminal 10 creates a third CO for printer corresponding to the third AP 8. Process of T704*c* is identical to process of T704*b* except that the data to be used (such as the group ID) is different. The third CO for printer incudes a third SC for printer, the public key TPK2, the SSID “ap3” of the third AP 8, and the AKM “dpp”. The third SC for printer includes the hash value HV, the group ID “office3”, the public key PPK2 of the printer 100, and a digital signature DSpr3. The digital signature DSpr3 is created by using the hash value HV, the group ID “office3”, the public key PPK2 of the printer 100, and the private key tsk2.

In T710, the terminal 10 sends a CRes including the first to third COs for printer created in T704*a* to T704*c* to the printer 100 via the Wi-Fi I/F 16.

In T710, the printer 100 receives the CRes from the terminal 10 via the Wi-Fi I/F 116. In this case, the printer 100 stores the first to third COs for printer in the CRes in the memory 134 in T712. Then, the printer 100 executes a connection process (FIG. 10) to be described later.

(Connection Process; FIG. 10)

The connection process with the CPU 132 of the printer 100 executes according to the program 136 will be described with reference to FIG. 10. In S10, the CPU 132 selects one CO for printer from among the first to third COs for printer received from the terminal 10 in T710 of FIG. 9.

In S12, the CPU 132 determines whether the AKM in the CO for printer selected in S10 indicates “dpp”. In a case of determining that the AKM indicates “dpp” (YES to S12), that is, in a case where the CO for printer selected in S10 is the CO for printer for establishing the DPP connection, the CPU 132 proceeds to S14.

In S14, the CPU 132 broadcasts a DReq (see T410 of FIG. 6) including the CO for printer selected in S10 via the Wi-Fi I/F 116. The broadcasted DReq is a signal for requesting an AP to execute authentication and send a SC for AP, and is also a signal for confirming whether the DPP connection can be established with this AP. Alternatively in a variant, the DReq may be uncasted.

In S16, the CPU 132 determines whether the CPU 132 has received a DRes from an AP in response to the DReq sent in S14 (hereinafter “target DReq”) via the Wi-Fi I/F 116. Following two situations are expected as situations in which the CPU 132 receives no DRes. A first situation is a situation in which an AP cannot receive the target DReq because the AP is not located close to the printer 100. A second situation is a situation in which an AP near the printer 100 can receive the target DReq but the authentication fails in the AP (e.g., when the AP does not store the group ID matching the group ID included in the CO in the target DReq). In this situation, since the authentication fails, the AP does not send the DRes, thereby the CPU 132 does not receive the DRes from the AP. Further, a situation in which the CPU 132 receives the DRes is a situation in which the AP near the printer 100 can receive the target DReq and the AP can successfully execute the authentication.

In a case of determining that the CPU 132 receives the DRes in response to the target DReq (YES to S16), the CPU 132 executes authentication of the sender of the DRes and of the respective information in the DRes (i.e., the hash value, group ID, and public key), and creates a connection key in S17 (see T422, T424 of FIG. 6). Then, the CPU 132 determines the CO selected in S10 as a selection target in S18 and proceeds to S30. On the other hand, in a case of determining that the DRes in response to the target DReq has not been received (NO to S16), the CPU 132 skips S17 and S18, and proceeds to S30. In a case where the authentication fails in S17, the CPU 132 skips S18 and proceeds to S30.

Further, in a case of determining that the AKM indicates "psk" (NO to S12), that is, in a case where the CO for printer selected in S10 is the CO for printer for establishing the Legacy connection, the CPU 132 proceeds to S24.

In S24, the CPU 132 broadcasts a Probe Request (hereinafter simply termed "PReq") in conformity with the Wi-Fi scheme via the Wi-Fi I/F 116. The broadcasted PReq includes the SSID included in the CO for printer selected in S10, and is a signal for confirming whether the Legacy connection can be established with the AP identified by the SSID. In a variant, the PReq may be unicasted.

In S25, the CPU 132 determines whether receiving a Probe Response (hereinafter simply termed "PRes") in response to the PReq sent in S24 (hereinafter "target PReq") from the AP via the Wi-Fi I/F 116. Following two situations are expected as situations in which the CPU 132 does not receive no PRes. A first situation is a situation in which an AP cannot receive the target PReq because the AP is not located close to the printer 100. A second situation is a situation in which an AP near the printer 100 can receive the target PReq but the SSID included in the target PReq does not match the SSID stored in the AP. Since the two SSIDs do not match each other, the AP does not send the PRes, so the CPU 132 cannot receive the PRes. Further, a situation in which the CPU 132 receives the PRes is a situation in which the AP near the printer 100 can receive the target PReq and also the SSID included in the target PReq matches the SSID stored in this AP.

In a case of determining that the CPU 132 has received the PRes in response to the target PReq (YES to S25), the CPU 132 proceeds to S26. In a case of determining that the CPU 132 does not receive the PRes in response to the target PReq (NO to S25), the CPU 132 skips S26 and S28 and proceeds to S30.

In S26, the CPU 132 determines whether the relation information in the security information included in the CO for printer selected in S10 matches relation information included in the PRes received in S25, related to security of the AP that is the sender of the Pres. The CPU 132 proceeds to S28 in a case of determining that the information match each other (YES to S26). In a case of determining that the information does not match each other (NO to S26), the CPU 132 skips S28 and proceeds to S30. Process of S28 is identical to process of S18.

In S30, the CPU 132 determines whether there is a CO for printer that has not been selected among the first to third COs for printer received from the terminal 10 in T710 of FIG. 9. The CPU 132 returns to S10 in a case of determining that there is a remaining CO for printer that has not been selected (YES to S30), and selects a new CO for printer from among the first to third COs for printer. On the other hand, the CPU 132 proceeds to S32 in a case of determining that there is no CO for printer that has not been selected (NO to S30).

In S32, the CPU 132 determines whether one or more COs for printer determined as the selection target in S18 and S28 exist. In a case of determining that none of the COs for printer among the first to third COs for printer received from the terminal 10 in T710 of FIG. 9 is selected as the selection target (NO to S32), the CPU 132 causes the display unit 114 to display a notification screen in S50. The notification screen includes various messages for prompting the user to perform operations for establishing the Wi-Fi connection with the AP. The various messages may include a message for prompting the user to perform the BS with an AP that is different from any of the AP6, AP7 and AP8 and is located near the printer 100, and a message for prompting the user to perform an operation to bring the printer 100 close to one of the AP6, AP7 and AP8. Thus, the operations for establishing the Wi-Fi connection with the AP is notified to the user. When S50 is completed, the process of FIG. 10 is terminated.

Further, in a case of determining that the one or more COs for printer determined as the selection target exist (YES to S32), the CPU 132 causes the display unit 114 to display a selection screen in S34. The selection screen is a screen for selecting a connection target AP (hereinafter "target AP") from among one or more APs corresponding to the one or more Cos for printer determined as the selection target in S18 and S28. The selection screen includes one or more SSIDs of the one or more APs.

Next, in S36, the CPU 132 determines if receiving an operation of selecting a target SSID corresponding to the target AP from among one or more SSIDs in the selection screen. If it is determined that the operation is received (YES to S36), the CPU 132 proceeds to S38.

In S38, the CPU 132 deletes, from among the first to third COs for printer, two COs other than the CO for printer including the target SSID selected in S36 (hereinafter "target CO") from the memory 134. Deleting unused Cos causes increased free space in the memory 134.

Next, in S40, the CPU 132 executes the 4-way handshake communication using the AP information in the target CO or the connection key created in S17. By executing the 4-way handshake communication, the Wi-Fi connection (i.e., the Legacy connection or the DPP connection) is established between the printer 100 and the target AP.

Next, in S42, the CPU 132 shifts the state of the printer 100 from the respondent state to the non-respondent state. As aforestated, the respondent state has a higher processing load as compared to the non-respondent state. The processing load of the printer 100 can be reduced by shifting to the non-respondent state as compared to an option in which the respondent state is maintained. When the process of S42 is completed, the process of FIG. 10 is terminated.

Figure 12:
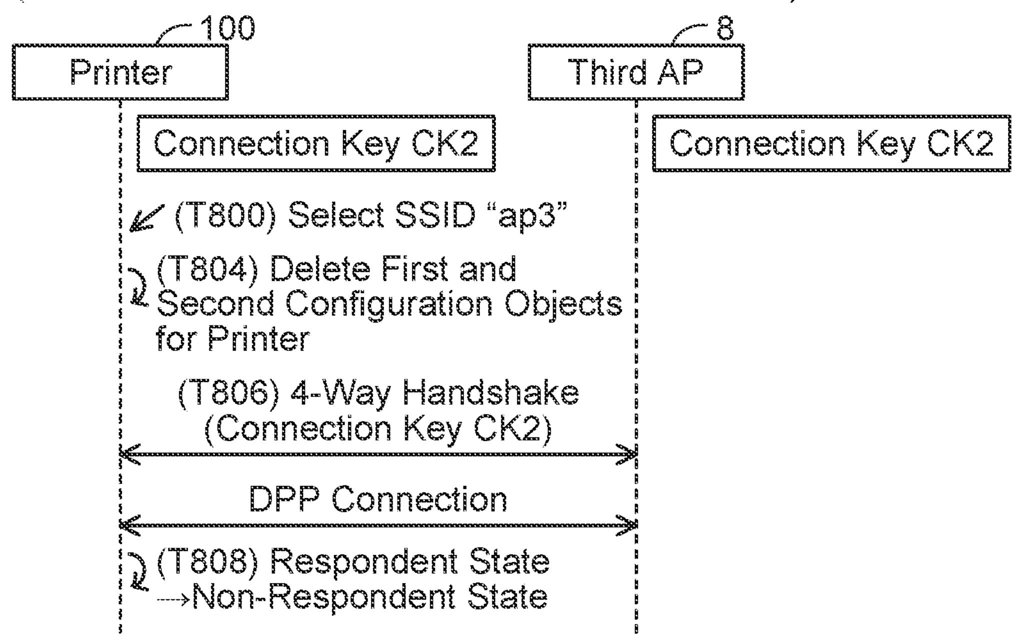
FIG. 12 shows a continuation of FIG. 11 (in a case of a DPP connection)
Figure 13:
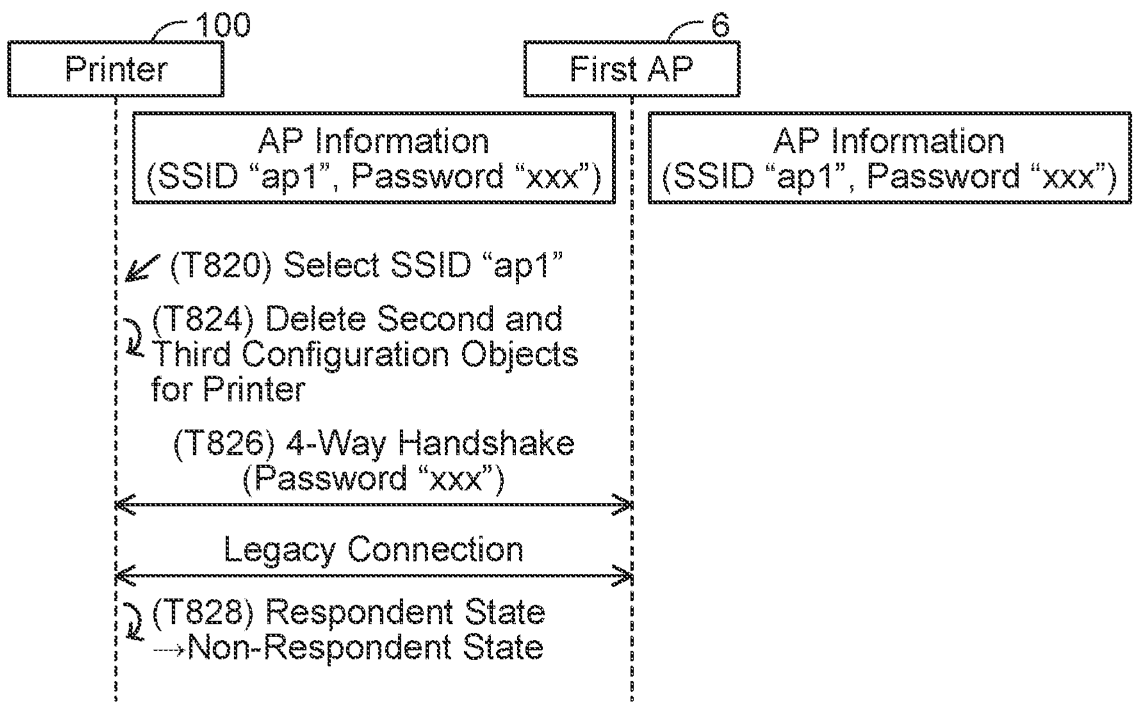
FIG. 13 shows a continuation of FIG. 11 (in a case of a Legacy connection).

(Specific Case; FIGS. 11 to 13)

A specific case implemented by the connection process of FIG. 10 will be described with reference to FIGS. 11 to 13.

In T720, the printer 100 selects the first CO for printer from among the first to third COs for printer (S10 of FIG. 10). In 1722, the printer 100 determines that the AKM in the first CO for printer indicates "psk" (NO to S12). Then, in T724, the printer 100 broadcasts the target PReq including the SSID "ap1" in the first CO for printer (S24). In the present case, the first AP 6 corresponding to the first CO for printer is installed close to the printer 100. Thus, in T726, the printer 100 receives the PRes from the first AP 6 (YES to S25).

In the present case, the relation information in the security information included in the first CO for printer matches information (i.e., relation information related to security of the first AP 6) in the PRes of T726. Thus, in T728, the printer 100 determines that the information matches each other (YES to S26) and determines the first CO for printer as the selection target (S28).

Next, in T740, the printer 100 selects the second CO for printer from the second and third COs for printer (YES to S30, S10). In T742, the printer 100 determines that the AKM in the second CO for printer indicates "dpp" (YES to S12). Then, in T744, the printer 100 broadcasts the target DReq including the second CO for printer (S14). In the present case, the second AP 7 corresponding to the second CO for printer is not installed close to the printer 100. Due to this, in T748, the printer 100 determines that the DRes in response to the target DReq is not received (NO to S16) and thus does not determine the second CO for printer as the selection target.

Then, in T760, the printer 100 selects the remaining third CO for printer (YES to S30, S10). In T762, the printer 100 determines that the AKM in the third CO for printer indicates "dpp" (YES to S12). Then, in T764, the printer 100 broadcasts the target DReq including the third SC for printer (S14).

In the present case, the third AP 8 corresponding to the third CO for printer is installed close to the printer 100. Thus, in T764, the third AP 8 receives the target DReq from the printer 100. Then, in 1766, the third AP 8 authenticates the sender of the target DReq (i.e., the printer 100) and the respective information in the target DReq (i.e., the hash value HV, "office3", and public key PPK2), the authentication succeeds, and a connection key CK2 is created. The process of T766 is identical to processes of T412 and T414 of FIG. 6 except that the data to be used (such as the key and the digital signature) is different. The connection key CK2 is created by using the public key PPK2 of the third SC for printer and the private key ask2 of the third AP 8. In T768, the third AP 8 sends the DRes in response to the target DReq. This DRes includes the third SC for AP.

When the printer 100 receives the DRes from the third AP 8 in T768 (YES to S16), the printer 100 authenticates the sender of the target DRes (i.e., the third AP 8) and the respective information in the DRes (i.e., the hash value HV, "office3", and public key APK2) in T770, the authentication succeeds, and a connection key CK2 is created (S17). The process of T770 is identical to processes T422 and T424 of FIG. 6 except that the subject of action is the printer 100 and the data to be used (such as the key and digital signature) is different. The connection key CK2 is created by using the private key psk2 of the printer 100 and the public key APK2 in the third SC for AP. In T772, the printer 100 determines the third CO for printer as the selection target (S18).

Next, in T780, the printer 100 determines that the first and third COs for printer that were determined as the selection targets (NO to S30 and YES to S32) exist. Then, in T782, the printer 100 displays the selection screen including the SSID "apt" of the first AP 6 and the SSID "ap3" of the third AP 8 (S34).

(Case pf DPP Connection; FIG. 12)

Continuing from processes of FIG. 11, a case of establishing the DPP connection with the third AP 8 will be described in FIG. 12. In T800, the printer 100 accepts an operation of selecting the SSID "ap3" of the third AP 8 in the selection screen (YES to S36).

In T804, the printer 100 deletes, from among the first to third COs for printer stored in T712 of FIG. 9, the first and second COs for printer other than the third CO for printer including the SSID "ap3" (i.e., the target CO) from the memory 134 (S38).

In T806, the printer 100 executes the 4-way handshake communication using the connection key CK2 created in T770 of FIG. 11 (S40). As a result of this, the DPP connection is established between the printer 100 and the third AP 8.

In T808, the printer 100 shifts the state of the printer 100 from the respondent state to the non-respondent state (S42).

(Case of Legacy Connection; FIG. 13)

Continuing from processes of FIG. 11, a case of establishing the Legacy connection with the first AP 6 will be described in FIG. 12. In T820, the printer 100 accepts an operation of selecting the SSID "ap1" of the first AP 6 in the selection screen (YES to S36).

In T824, the printer 100 deletes, from among the first to third COs for printer stored in T712 of FIG. 9, the second and third COs for printer other than the first CO for printer including the SSID "ap1" (i.e., the target CO) from the memory 134 (S38).

In T826, the printer 100 executes the 4-way handshake communication using the AP information in the first CO for printer (i.e., the SSID "apt" and the password "xxx") (S40). As a result of this, the Legacy connection is established between the printer 100 and the first AP 6. Process of T828 is identical to process of T808 of FIG. 12.

Effects of Present Embodiment

According to the configuration of the present embodiment, in the case where the first to third COs for printer are received from the terminal 10 (T710 of FIG. 9), the printer 100 sends, for each of the first to third COs for printer, the DReq or the PReq to the AP corresponding to the CO for printer by using the corresponding CO for printer (S14 or S24 of FIG. 10). In the case where the response(s) to the DReqs or the PReqs are received from the AP(s) (YES to S16 or YES to S25), the printer 100 determines the CO for printer corresponding to each of such responses as the selection target (S18 or S28). Then, the printer 100 displays the selection screen for selecting the target AP from among the one or more APs corresponding to the one or more COs for printer determined as the selection targets (S34). That is, the selection screen does not include an SSID of an AP with which a Wi-Fi connection cannot be established. Thus, the possibility of selecting an SSID corresponding to an AP with which the printer 100 cannot establish a Wi-Fi connection may be suppressed, thereby the printer 100 can suitably establish the Wi-Fi connection (i.e., the Legacy connection or the DPP connection) with the target AP selected in the selection screen.

Further, in the case where the CO for printer selected in S10 of FIG. 10 is the CO for printer for establishing the DPP connection (YES to S12), the printer 100 sends the DReq in conformity with the DPP to the AP corresponding to the CO for printer as a confirm signal for confirming whether the DPP connection can be established (S14). Further, in the case where the CO for printer selected in S10 of FIG. 10 is the CO for printer for establishing the Legacy connection (NO to S12), the printer 100 sends the PReq to the AP corresponding to the CO for printer as the confirm signal for confirming whether the Legacy connection can be established (S24). A proper confirm signal can be sent according to a type of the selected CO for printer.

(Corresponding Relationship)

The printer 100 is an example of "communication device", the Wi-Fi I/F 116 is an example of "wireless interface", and the display unit 114 is an example of "display unit" The terminal 10 is an example of "terminal device". The AP 6, AP 7, and AP 8 are an example of "N access points". The first AP 6 and the third AP 8 are an example of "M access points". The public key PPK1 is an example of "public key" and the QR Codes is an example of "output information". The AReq is an example of "authentication request" and the ARes is an example of "authentication response". The first to third COs for printer is an example of "N pieces of wireless setting information". The second and third COs for printer are examples of "first wireless setting information". The first CO for printer is an example of "second wireless setting information". The DReq and the PReq are examples of "confirm signal". The DRes and the PRes are examples of "response signal". The selection screen in S34 is an example of "selection screen" and the notification screen in S50 of FIG. 10 is an example of "notification screen".

T514 of FIG. 7 is an example of "execute an output control process", T610 is an example of "receive, via the wireless interface, an authentication request" T620 of FIG. 8 is an example of "send an authentication response", and T710 of FIG. 9 is an example of "receive N pieces of wireless setting information". S14 and S24 of FIG. 10 are examples of "send by using the wireless setting information a confirm signal". S16 and S25 are examples of "receive a response signal". S34 is an example of "cause the display unit to display a selection screen", S36 is an example of "select a target access point", and S40 is an example of "establish a wireless connection".

(Modification 1) "Communication device" may be, instead of the printer 100, another device such as a scanner, a multi-function device, a portable terminal, a PC, or a server.

(Modification 2) Without displaying the QR Code QR Code the printer 100 may cause the print executing unit 118 to print the QR Code. Here, printing of the QR Code is an example of "output control process".

(Modification 3) Each of the printer 100 and the terminal 10 may be provided with a wireless interface (such as a BT I/F and a NFC I/F) in conformity with a wireless scheme different from the Wi-Fi scheme (such as a Bluetooth (BT) (registered trademark) scheme and a Near Field Communication (NFC) scheme). In this case, the printer 100 may instruct the BT I/F of the printer 100 to send the public key, etc. in T514 of FIG. 7. The terminal 10 can receive the public key, etc. via the BT I/F of the terminal 10. In this variant, instructing the BT I/F to send the public key, etc. is an example of the "output control". In another variant, the printer 100 may store the public key, etc. in the NFC I/F of the printer 100. In this case, the terminal 10 can receive the public key, etc. via the NFC I/F of the terminal 10. Here, storing the public key, etc. in the NFC I/F is an example of the "output control process".

(Modification 4) Without accepting the selection of the target SSID in the selection screen, the printer 100 may automatically select the target CO from among the one or more COs for printer determined as the selection target without accepting the selection by the user. Here, automatically selecting the target CO is an example of "select a target access point".

(Modification 5) The selection screen may include all the SSIDs "ap1" to "ap3". Further, the selection screen may include, for each of the SSIDs "ap1" to "ap3", a result on whether the Wi-Fi connection can be established with the AP identified by the SSID. By displaying all the SSIDs, the user may notify all the APs located near the printer 100.

(Modification 6) "establish a wireless connection" is not limited to the 4-way handshake communication using the connection key created in S17 of FIG. 10 (S40). For example, the printer 100 may accept the selection of the target SSID in the selection screen (YES to S36), after which the printer 100 may create a connection key using the received DRes and the CO for printer including the target SSID. Further, the printer 100 may execute the 4-way handshake communication using the connection key created after having selected the target SSID.

(Modification 7) The process of S50 of FIG. 10 may be skipped. In this variant, "cause the display unit to display a notification screen" may be omitted. By skipping the displaying process, the present disclosure can be applied to a printer which does not include a display unit.

(Modification 8) The processes of S12 and S24 to S28 of FIG. 10 may be skipped. Here, "second wireless setting information" may be omitted.

(Modification 9) The process of S38 of FIG. 10 may be skipped. In this variant, "delete one or more pieces of wireless setting information" may be omitted. By skipping the deleting process, the processing load of the printer 100 may be suppressed.

(Modification 10) Instead of shifting the non-respondent state after having executed the 4-way handshake communication (S42 of FIG. 10), the printer 100 may shift to the non-respondent state after having received the first to third COs for printer from the terminal 10 and before initiating the connection process. A state of a communication device may simply be shifted after having received the N pieces of wireless setting information from a state of being capable of sending an authentication response to a state being incapable of sending the authentication response.

(Modification 11) The process of S42 of FIG. 10 may be skipped. Here, "shift a state of the communication device" may be omitted.

(Modification 12) The connection process of FIG. 10 is not limited to the case of receiving three COs for printer, as in the embodiment, and is executed in cases where two or more COs for printer or four or more COs for printer are received. Further, the connection process of FIG. 10 is also executed in a case where one CO for printer is received. In general terms, "N" may simply be an integer of 1 or more.

(Modification 13) At least one or more of the processes of FIGS. 2 to 13 may be implemented by hardware such as a logic circuit.

What is claimed is:

1. A communication device comprising;

a wireless interface configured to execute a wireless communication in conformity with Wi-Fi standard; and a controller configured to:

execute an output control process for externally outputting output information, the output information being obtained by using a public key;

receive, from a terminal device, via the wireless interface, an authentication request in which the public key is used;

send an authentication response to the terminal device via the wireless interface;

after the authentication response has been sent to the terminal device, receive plural pieces of wireless setting information from the terminal device via the wireless interface, each of the plural pieces of wireless setting information being for establishing a wireless connection with an access point corresponding to the wireless setting information;

send, by using plural pieces of wireless setting information, a confirm signal to the access point corresponding to each of the plural pieces of wireless setting information via the wireless interface;

receive, via the wireless interface, a response signal in response to sending the confirm signal from an access point to which the confirm signal is sent;

select a target access point from among one or more access points by which the response signals are received; and establish a wireless connection with the selected target access point via the wireless interface.

2. The communication device as in claim 1, wherein in a case where first wireless setting information among the plural pieces of wireless setting information includes information in conformity with Device Provisioning Protocol (DPP) of the Wi-Fi standard, the controller sends the confirm signal, which is a DPP Peer Discovery Request in conformity with the DPP, to a first access point corresponding to the first wireless setting information.

3. The communication device as in claim 1, wherein in a case where second wireless setting information among the plural pieces of wireless setting information includes a Service Set Identifier (SSID) and a password, the controller sends the confirm signal, which is a Probe Request, to a second access point corresponding to the second wireless setting information.

4. The communication device as in claim 1, wherein the controller is further configured to:

in a case where the plural pieces of wireless setting information are received from the terminal device, store the plural pieces of wireless setting information in a memory; and after the target access point has been selected, delete, from the memory, one or more pieces of the wireless setting information other than the wireless setting information corresponding to the target access point among the plural pieces of wireless setting information.

5. The communication device as in claim 1, wherein the controller is further configured to:

after the plural pieces of wireless setting information have been received from the terminal device, shift a state of the communication device from a state capable of sending the authentication response to a state incapable of sending the authentication response.

6. A communication device comprising;

a display unit;

a wireless interface configured to execute a wireless communication in conformity with Wi-Fi standard; and a controller configured to:

execute an output control process for externally outputting output information, the output information being obtained by using a public key of the communication device;

receive, from a terminal device, via the wireless interface, an authentication request in which the public key is used after the terminal device has been obtained the public key;

send an authentication response to the terminal device via the wireless interface;

after the authentication response has been sent to the terminal device, receive one or more pieces of wireless setting information from the terminal device via the wireless interface, each of the one or more pieces of wireless setting information being for establishing a wireless connection with an access point corresponding to the wireless setting information;

send, by using one or more pieces of wireless setting information, a confirm signal to the access point corresponding to each of the one or more pieces of wireless setting information via the wireless interface;

receive, via the wireless interface, a response signal in response to sending the confirm signal from an access point to which the confirm signal is sent;

cause the display unit to display a selection screen for selecting a target access point from among one or more access points by which the response signals are received; and in a case where the target access point is selected from among the one or more access points in the selection screen, establish a wireless connection with the selected target access point via the wireless interface.

7. The communication device as in claim 6, wherein the controller causes the display unit to display the selection screen in a case where receiving the response signal from any of the one or more access points, and the controller is further configured to:

in a case where not receiving the response signal from any of the one or more access points, cause the display unit to display a notification screen for notifying an action for establishing a wireless connection with an access point.

8. The communication device as in claim 6, wherein in a case where first wireless setting information among the one or more pieces of wireless setting information includes information in conformity with Device Provisioning Protocol (DPP) of the Wi-Fi standard, the controller sends the confirm signal, which is a DPP Peer Discovery Request in conformity with the DPP, to a first access point corresponding to the first wireless setting information.

9. The communication device as in claim 6, wherein in a case where second wireless setting information among the one or more pieces of wireless setting information includes a Service Set Identifier (SSID) and a password, the controller sends the confirm signal, which is a Probe Request, to a second access point corresponding to the second wireless setting information.

10. The communication device as in claim 6, wherein the one or more pieces of wireless setting information comprise two or more pieces of wireless setting information, the controller is further configured to:

in the case where the two or more pieces of wireless setting information are received from the terminal device, store the two or more pieces of wireless setting information in a memory; and after the target access point has been selected, delete, from the memory, one or more pieces of the wireless setting information other than the wireless setting information corresponding to the target access point among the two or more pieces of wireless setting information.

11. The communication device as in claim 6, wherein the controller is further configured to:

after the one or more pieces of wireless setting information have been received from the terminal device, shift a state of the communication device from a state capable of sending the authentication response to a state incapable of sending the authentication response.

12. A non-transitory computer-readable medium storing computer-readable instructions for a communication device, wherein the communication device comprises a processor and a wireless interface configured to execute a wireless communication in conformity with Wi-Fi standard, and the computer-readable instructions, when executed by the processor, causing the communication device to:

execute an output control process for externally outputting output information, the output information being obtained by using a public key;

receive, from a terminal device, via the wireless interface, an authentication request in which the public key is used which obtained the public key;

send an authentication response to the terminal device via the wireless interface;

after the authentication response has been sent to the terminal device, receive plural pieces of wireless setting information from the terminal device via the wireless interface, each of the plural pieces of wireless setting information being for establishing a wireless connection with an access point corresponding to the wireless setting information;

send, by using plural pieces of wireless setting information, a confirm signal to the access point corresponding to each of the plural pieces of wireless setting information via the wireless interface;

receive, via the wireless interface, a response signal in response to sending the confirm signal from an access point to which the confirm signal is sent;

select a target access point from one or more access points by which the response signals are received; and establish a wireless connection with the selected target access point via the wireless interface.

13. A non-transitory computer-readable medium storing computer-readable instructions for a communication device, wherein the communication device comprises a processor and a wireless interface configured to execute a wireless communication in conformity with Wi-Fi standard, and the computer-readable instructions, when executed by the processor, causing the communication device to:

execute an output control process for externally outputting output information, the output information being obtained by using a public key;

receive, from a terminal device, via the wireless interface, an authentication request in which the public key is used which obtained the public key;

send an authentication response to the terminal device via the wireless interface;

after the authentication response has been sent to the terminal device, receive one or more pieces of wireless setting information from the terminal device via the wireless interface, each of the one or more pieces of wireless setting information being for establishing a wireless connection with an access point corresponding to the wireless setting information;

send by using one or more pieces of wireless setting information, a confirm signal to the access point corresponding to each of the one or more pieces of wireless setting information via the wireless interface;

receive, via the wireless interface, a response signal in response to sending the confirm signal from an access point to which the confirm signal is sent;

cause a display unit to display a selection screen for selecting a target access point from among one or more access points by which the response signals are received; and in a case where the target access point is selected from among one or more access points in the selection screen, establish a wireless connection with the selected target access point via the wireless interface.

* * * * *